United States Patent
Bonanno et al.

(10) Patent No.: US 9,250,912 B2
(45) Date of Patent: Feb. 2, 2016

(54) FAST INDEX TREE FOR ACCELERATED BRANCH PREDICTION

(75) Inventors: James J. Bonanno, Wappingers Falls, NY (US); Brian R. Prasky, Wappingers Falls, NY (US); Anthony Saporito, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 13/494,443

(22) Filed: Jun. 12, 2012

(65) Prior Publication Data

US 2013/0332713 A1     Dec. 12, 2013

(51) Int. Cl.
    *G06F 9/32*            (2006.01)
    *G06F 9/38*            (2006.01)

(52) U.S. Cl.
    CPC .............. *G06F 9/3806* (2013.01); *G06F 9/3844* (2013.01)

(58) Field of Classification Search
    CPC .............................. G06F 9/3806; G06F 9/3844
    USPC ......................................................... 712/238
    See application file for complete search history.

(56) References Cited

U.S. PATENT DOCUMENTS

| | | | |
|---|---|---|---|
| 5,423,048 A * | 6/1995 | Jager ..................... | G06F 9/3804 711/137 |
| 5,434,985 A * | 7/1995 | Emma et al. .................. | 712/240 |
| 5,504,870 A * | 4/1996 | Mori et al. .................... | 712/238 |
| 5,805,876 A | 9/1998 | Bose et al. | |
| 6,256,729 B1 * | 7/2001 | Cherabuddi et al. .......... | 712/238 |
| 6,263,427 B1 * | 7/2001 | Cummins et al. ............. | 712/236 |
| 6,279,105 B1 * | 8/2001 | Konigsburg et al. .......... | 712/238 |
| 6,732,260 B1 * | 5/2004 | Wang et al. ................... | 712/237 |
| 6,772,279 B1 * | 8/2004 | Sun et al. ...................... | 711/108 |
| 6,912,650 B2 * | 6/2005 | Ukai et al. .................... | 712/237 |
| 7,082,520 B2 * | 7/2006 | Bonanno et al. ............. | 712/236 |

(Continued)

FOREIGN PATENT DOCUMENTS

| | | |
|---|---|---|
| CN | 1328664 | 12/2001 |
| CN | 1667570 | 9/2005 |
| CN | 1725175 | 1/2006 |

OTHER PUBLICATIONS

Yeh et al., "Two-Level Adaptive Training Branch Prediction", 1991, Proceedings of the 24th annual international symposium on Microarchitecture, pp. 51-61.*
Sadeghi et al., "Power-aware branch target prediction using a new BTB architecture", Oct. 2009, Very Large Scale Integration (VLSI-SoC), 2009 17th IFIP International Conference on, pp. 53-58.*

(Continued)

*Primary Examiner* — Andrew Caldwell
*Assistant Examiner* — Yuqing Xiao
(74) *Attorney, Agent, or Firm* — Cantor Colburn LLP; Margaret McNamara

(57) ABSTRACT

Embodiments relate to using a fast index tree for accelerated branch prediction. A system includes a branch target buffer, a FIT structure, and a processing circuit configured to perform a method. The method includes determining that searching of the branch target buffer is to be performed under FIT control. A current search address for searching of the branch target buffer is saved. The branch target buffer is searched at the saved current search address for a branch prediction. A FIT next-search address is determined based on reading branch taken and branch not taken paths for a next search level of predicted branches from the FIT structure. The searching of the branch target buffer is re-indexed based on the FIT next-search address. It is determined whether the searching at the saved current search address located the branch prediction.

13 Claims, 21 Drawing Sheets

(56) References Cited

U.S. PATENT DOCUMENTS

| | | |
|---|---|---|
| 7,676,663 B2 | 3/2010 | Prasky et al. |
| 2003/0212882 A1 | 11/2003 | Bonanno et al. |
| 2004/0186985 A1* | 9/2004 | Tran et al. .................... 712/239 |
| 2009/0204799 A1 | 8/2009 | Bonanno et al. |

OTHER PUBLICATIONS

D. Jimenez, Delay-Sensitive Branch Predictors for Future Technologies, PhD Thesis, University of Texas at Austin, Jan. 2002, 165 pages.

China Patent Application No. 201310231248.4 Office Action dated Jun. 3, 2015, 5 pages.

* cited by examiner

| Cycle: | 0 | 1 | 2 | 3 | 4 | 5 | 6 |
|---|---|---|---|---|---|---|---|
| Search level 0 | f0 index FIT | f1 FIT access results available | f2 re-index | | | | |
| Search level 1 | | | f0 index FIT | f1 FIT access results available | f2 re-index | | |
| Search level 2 | | | | | f0 index FIT | f1 FIT access results available | f2 re-index |

FIG. 11

FAST INDEX TREE FOR ACCELERATED BRANCH PREDICTION

BACKGROUND

The present invention relates generally to computer processing systems, and more specifically, to a fast index tree for accelerated branch prediction.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor may attempt to guess whether a conditional branch will be taken or not. A branch predictor may also include branch target prediction, which attempts to guess a target of a taken conditional or unconditional branch before it is computed by decoding and executing the instruction itself. A branch target may be a computed address based on an offset and/or an indirect reference through a register.

A branch target buffer (BTB) can be used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction. Other branch prediction components that may be included in the BTB or implemented separately include a branch history table and a pattern history table. A branch history table can predict the direction of a branch (taken vs. not taken) as a function of the branch address. A pattern history table can assist with direction prediction of a branch as a function of the pattern of branches encountered leading up to the given branch which is to be predicted.

SUMMARY

Exemplary embodiments include a system for using a fast index tree (FIT) for accelerated branch prediction. The system includes a branch target buffer, a FIT structure, and a processing circuit configured to perform a method. The method includes determining that searching of the branch target buffer is to be performed under FIT control. A current search address for searching of the branch target buffer is saved. The branch target buffer is searched at the saved current search address for a branch prediction. A FIT next-search address is determined based on reading branch taken and branch not taken paths for a next search level of predicted branches from the FIT structure. The searching of the branch target buffer is re-indexed based on the FIT next-search address. It is determined whether the searching at the saved current search address located the branch prediction. Based on the searching at the saved current search address locating the branch prediction, the searching of the branch target buffer continues under FIT control with the current search address set based on the FIT next-search address. Based on the searching at the saved current search address failing to locate the branch prediction, the searching of the branch target buffer is re-indexed with the saved current search address and the searching of the branch target buffer is performed without FIT control.

Additional exemplary embodiments include a computer program product for using a fast index tree for accelerated branch prediction. The computer program product includes a tangible storage medium readable by a processing circuit and storing instructions for execution by the processing circuit for performing a method. The method includes determining, by the processing circuit, that searching of a branch target buffer is to be performed under FIT control. A current search address for searching of the branch target buffer is saved. The method further includes searching the branch target buffer at the saved current search address for a branch prediction. The processing circuit determines a FIT next-search address based on reading branch taken and branch not taken paths for a next search level of predicted branches from a FIT structure. The searching of the branch target buffer is re-indexed based on the FIT next-search address. The processing circuit determines whether the searching at the saved current search address located the branch prediction. Based on the searching at the saved current search address locating the branch prediction, the searching of the branch target buffer continues under FIT control with the current search address set based on the FIT next-search address. Based on the searching at the saved current search address failing to locate the branch prediction, the searching of the branch target buffer is re-indexed with the saved current search address and the searching of the branch target buffer is performed without FIT control.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 11 depicts an example pipeline timing sequence for a FIT search pipeline according to an embodiment;

DETAILED DESCRIPTION

Exemplary embodiments provide a fast index tree for accelerated branch prediction. A branch predictor can include a branch target buffer (BTB) structure and a number of structures and buffers to support branch prediction and branch target prediction. The BTB can be searched in parallel to and independently from instruction fetching to find upcoming branches, in which case it is called lookahead branch prediction. Alternatively, it can be accessed simultaneously with or after fetching instructions and determining instruction boundaries in order to provide a prediction for each encountered branch instruction, in which case it is called synchronous branch prediction. In either case performance benefits of the BTB are a function of the accuracy of the prediction provided from the BTB and the latency required to access the BTB.

In exemplary embodiments, a fast index tree (FIT) accelerates branch prediction. The FIT is a table holding information about a subset of the branches in the BTB. Each entry in the FIT represents a node in a binary tree specifying from each branch in the FIT what the next predicted branch is along a not-taken path, and what the next predicted branch is along a taken path. The FIT improves branch prediction throughput in a lookahead branch predictor by accelerating re-indexing of a BTB search.

The FIT accelerates branch prediction throughput when predicting a subset of the branches in the BTB that are tracked in the FIT. Power may also be saved by avoiding unnecessary BTB sequential searches and by turning off auxiliary structures (such as a pattern history table and a multiple target table) when they are not needed.

Figure 1:
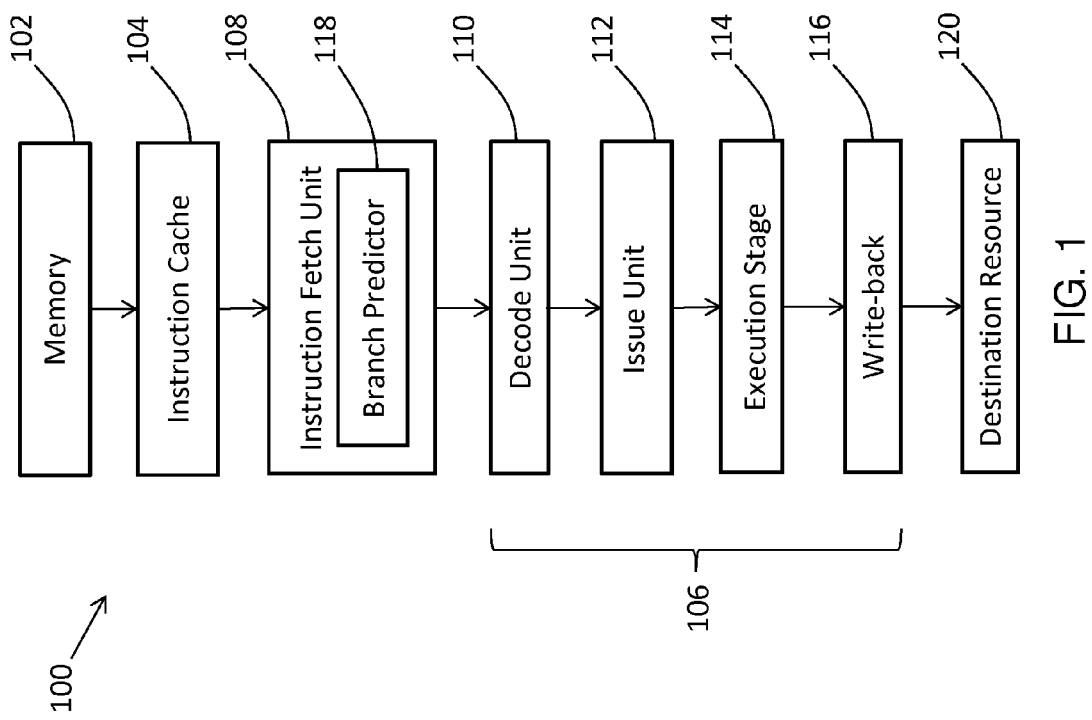
FIG. 1 depicts a processing system according to an embodiment.

FIG. 1 depicts a block diagram of a processing system 100 according to an embodiment. The processing system 100 includes a memory 102, an instruction cache 104, an instruction fetch unit 108, a branch predictor 118, and a processing pipeline 106. The processing system 100 may be included within a computer processor or otherwise distributed within a computer system. Instructions and data can be stored in memory 102, and the instruction cache 104 may access instructions in memory 102 and store the instructions to be fetched. The memory 102 may include any type of volatile or non-volatile memory, such as cache memory. The memory 102 and instruction cache 104 can include multiple cache levels. A data cache (not depicted) may also be included in the processing system 100.

In FIG. 1, a simplified example of the instruction fetch unit 108 and the processing pipeline 106 are depicted. The processing system 100 can further include multiple processing pipelines 106 and instruction fetch units 108. The processing pipeline 106 includes a decode unit 110, an issue unit 112, an execution stage 114, and write-back logic 116. The entire instruction fetch unit 108 or the branch predictor 118 may also be part of the processing pipeline 106. The processing pipeline 106 can include other features, such as error checking and handling logic, one or more parallel paths through the processing pipeline 106, and other features known in the art. While a forward path through the processing system 100 is depicted in FIG. 1, other feedback and signaling paths may be included between elements of the processing system 100.

The instruction fetch unit 108 fetches instructions from the instruction cache 104 for further processing by the decode unit 110. In an exemplary embodiment, the instruction fetch unit 108 includes the branch predictor 118. Alternatively, the branch predictor 118 may be located separately from the instruction fetch unit 108. The instruction fetch unit 108 can also include other branch prediction logic (not depicted). The branch predictor 118 is an example of a processing circuit to implement a fast index tree for accelerated branch prediction.

The decode unit 110 decodes instructions and passes the decoded instructions, portions of instructions, or other decoded data to the issue unit 112. The issue unit 112 analyzes the instructions or other data and transmits the decoded instructions, portions of instructions, or other data to one or more execution units in the execution stage 114 based on the analysis. The execution stage 114 executes the instructions. The execution stage 114 may include a plurality of execution units, such as fixed-point execution units, floating-point execution units, load/store execution units, and vector execution units. The write-back logic 116 writes results of instruction execution back to a destination resource 120. The destination resource 120 may be any type of resource, including registers, cache memory, other memory, I/O circuitry to communicate with other devices, other processing circuits, or any other type of destination for executed instructions or data.

Figure 2:
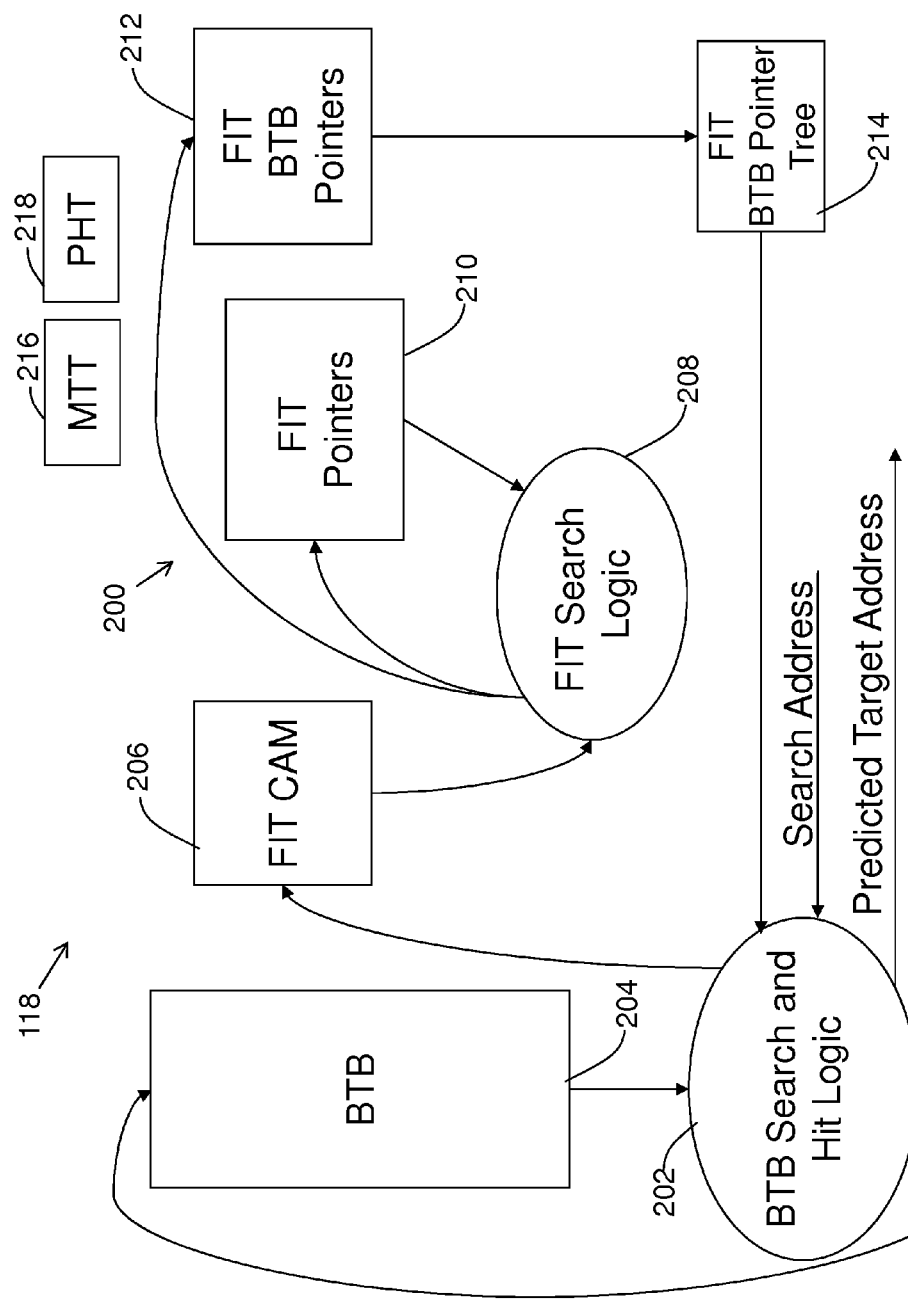
FIG. 2 depicts a branch predictor according to an embodiment.

FIG. 2 depicts an example of the branch predictor 118 of FIG. 1 in greater detail. The example branch predictor 118 of FIG. 2 includes BTB search and hit logic 202, BTB 204, FIT content addressable memory (CAM) 206, FIT search logic 208, FIT pointers 210, FIT BTB pointers 212, and a FIT BTB pointer tree 214. The branch predictor 118 can also include several auxiliary structures to support branch prediction, such as a multiple target table (MTT) 216 and a pattern history table (PHT) 218. The FIT CAM 206, FIT pointers 210, and FIT BTB pointers 212 are collectively referred to as a FIT structure 200. The FIT structure 200 is smaller in capacity than the BTB 204. The BTB search and hit logic 202 searches BTB entries in the BTB 204, while the FIT search logic 208 searches FIT entries in the FIT pointers 210 and the FIT BTB pointers 212. Although the BTB search and hit logic 202 and the FIT search logic 208 are depicted separately, it will be understood that they can be combined into a single logic block or further subdivided.

Figure 3:
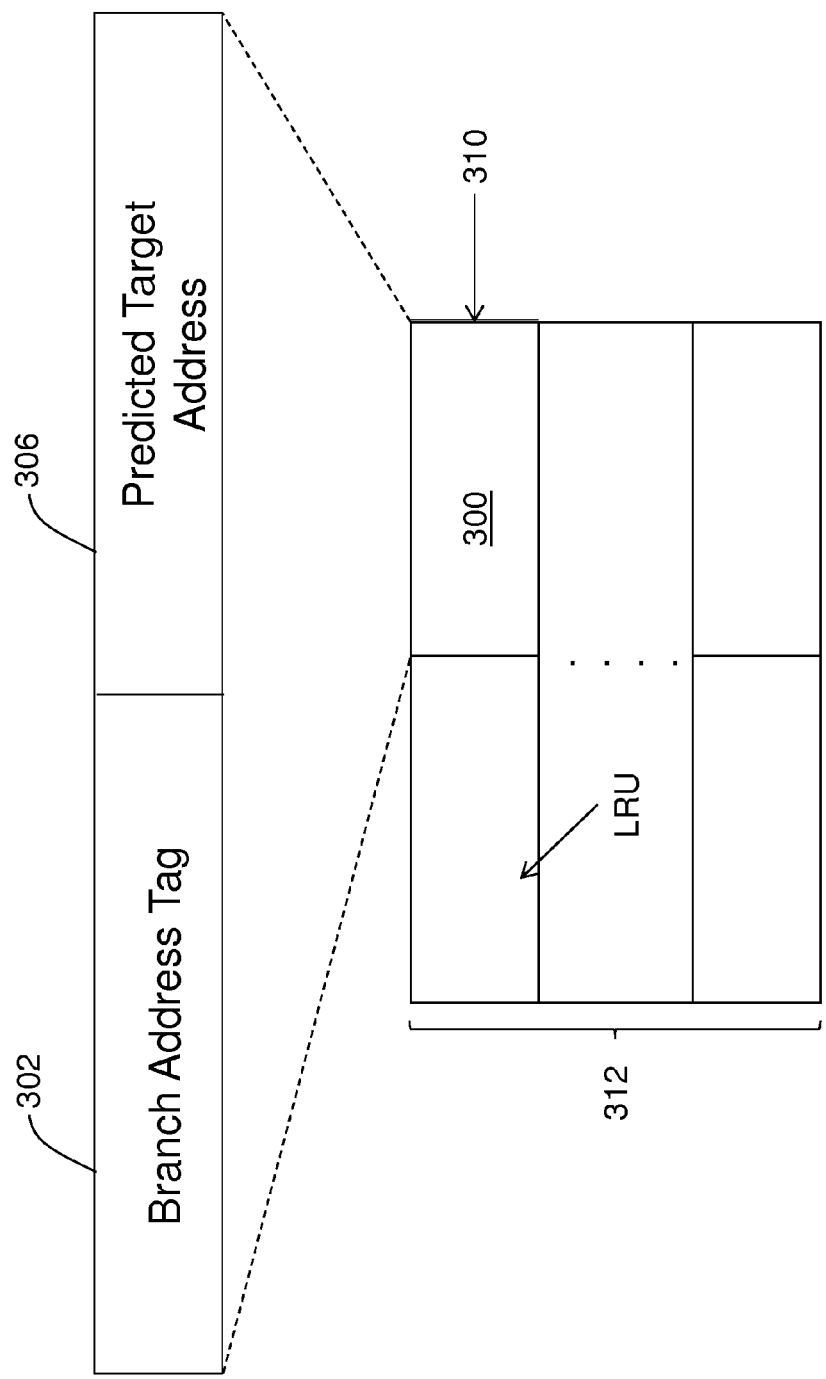
FIG. 3 depicts a branch target buffer entry according to an embodiment.

The BTB 204 is set associative, including multiple sets of BTB entries. A generic example of a BTB entry is depicted in FIG. 3 as BTB entry 300 (also referred to as entry 300), which includes a branch address tag 302 and a predicted target address 306. With continued reference to FIGS. 1-3, the branch address tag 302 is used to locate an entry within a BTB row 310, where the BTB 204 of FIG. 2 can include multiple BTB rows 312 and multiple set associative BTB entries per BTB row 310. Each BTB entry 300 can include other branch prediction information (not depicted), such as a branch direction to indicate whether the associated branch was taken or not taken. A least recently used (LRU) identifier can be used to identify the least recently used BTB entry 300 in a BTB row 310 to support a replacement policy in the BTB 204. Although the example of FIG. 3 includes two BTB entries 300 (columns) per BTB row 310, other embodiments can include a different number of BTB entries 300 per BTB row 310, e.g., four or more.

In an exemplary embodiment, an address of an instruction fetched by the instruction fetch unit 108 of FIG. 1 is used as a starting search address to access the branch predictor 118 and predict a branch target address. When looking for branch predictions, the BTB 204 is read and can provide a branch prediction if it contains an entry with a branch address tag 302 matching the search address. The BTB 204 provides input to BTB search and hit logic 202 to determine whether a match or "hit" is located based on the search address. If a match is found, the BTB search and hit logic 202 outputs a predicted target address. It redirects itself with a new search address that is sequential to the predicted branch address when the branch is predicted not-taken. It redirects itself with a new search address that is the predicted target address when the branch is predicted taken. The FIT structure 200 can be used to accelerate branch predictions by providing predictions that look ahead down possible taken and not-taken branch paths to the BTB search and hit logic 202.

Similar to the BTB 204, the FIT structure 200 is a fully associative cache of branches, and any replacement policy can be implemented to manage FIT entries in the FIT structure 200, such as FIFO or LRU or pseudo-LRU. The FIT CAM 206 is used to translate between BTB location information (row and column in the BTB 204) to FIT location (row in the FIT pointers 210 and FIT BTB pointers 212). The FIT BTB pointers 212 are used to re-direct the BTB search once the FIT search logic 208 takes control. The FIT pointers 210 in the FIT structure 200 are used to re-direct the FIT search performed by the FIT search logic 208. The FIT BTB pointer tree 214 holds a tree of possible future branch predictions extracted from the FIT structure 200 for multiple search levels based on the FIT search performed by the FIT search logic 208.

Figure 4:
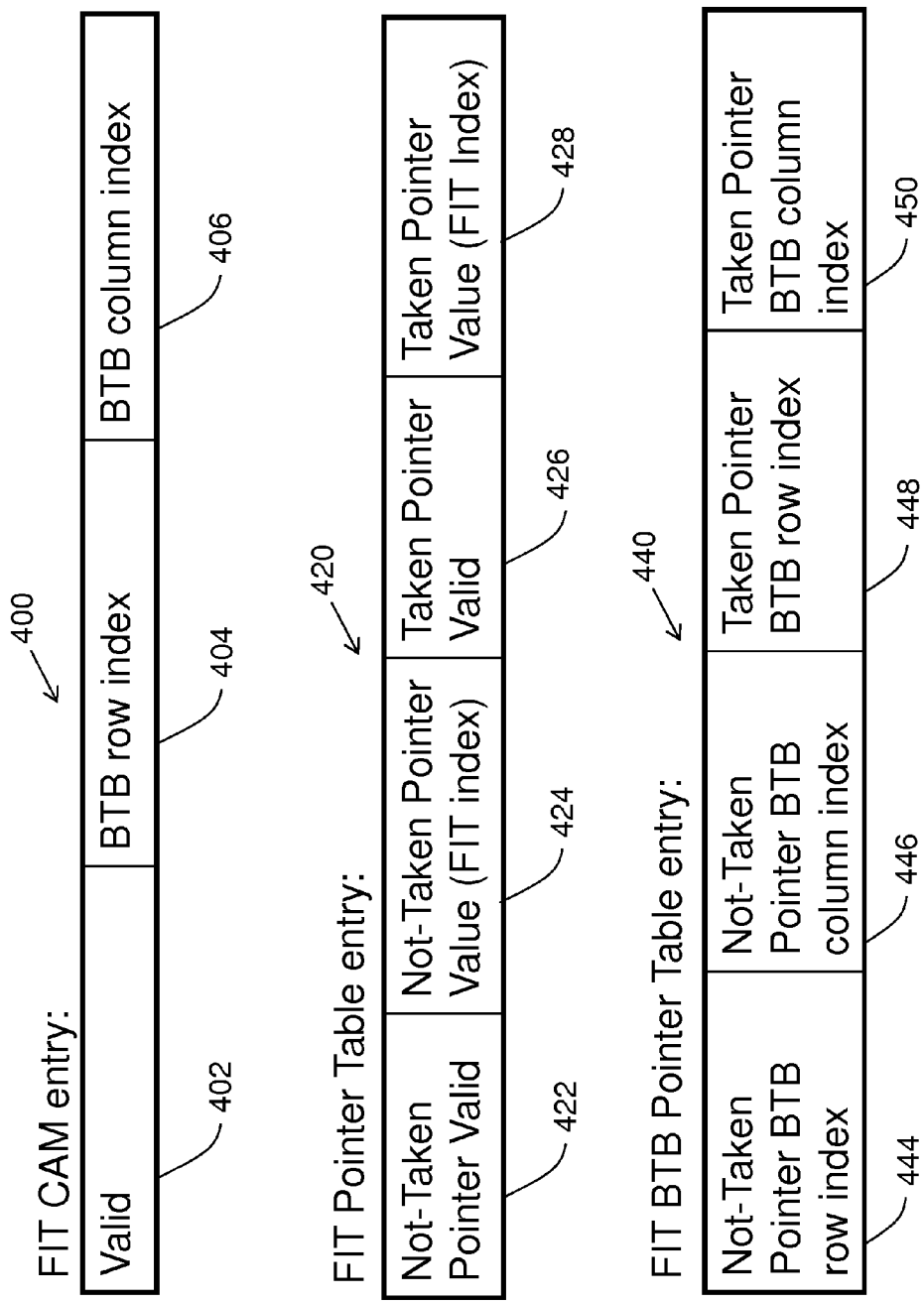
FIG. 4 depicts an example of various FIT entries according to an embodiment.

FIG. 4 depicts an example of a FIT CAM entry 400, a FIT pointer table entry 420, and a FIT BTB pointer table entry 440. The FIT CAM entry 400 is an example entry format from the FIT CAM 206 of FIG. 2 and includes a FIT CAM valid field 402, a BTB row index 404, and a BTB column index 406. The FIT CAM valid field 402 indicates whether an associated FIT entry is valid and may be implemented using a single bit. The BTB row index 404 is an index of a BTB congruence class corresponding to a branch being tracked in a FIT entry. The BTB column index 406 is a BTB column/way corresponding to the branch being tracked in the FIT entry. The FIT pointer table entry 420 is an example entry format from the FIT pointers 210 of FIG. 2 and includes a not-taken pointer valid field 422, a not-taken pointer value (FIT index) 424, a taken pointer valid field 426, and a taken pointer value (FIT index) 428. The not-taken pointer value 424 is the FIT index of the FIT entry representing the first branch encountered along a NotTaken path of the branch represented by the current FIT entry. The taken pointer value 428 is the FIT index of the FIT entry representing the first branch encountered along a Taken path of the branch represented by the current FIT entry. The not-taken pointer valid field 422 indicates whether or not the node represented by the current FIT entry has a valid NotTaken child pointer in the not-taken pointer value 424. Similarly, the taken pointer valid field 426 indicates whether or not the node represented by the current FIT entry has a valid Taken child pointer in the taken pointer value 428. The not-taken pointer valid field 422 and taken pointer valid field 426 indicate validity of an associated pointer, where an invalid pointer can be represented as NULL. The FIT BTB pointer table entry 440 is an example entry format from the FIT BTB pointers 212 of FIG. 2 and includes a not-taken pointer BTB row index 444, a not-taken pointer BTB column index 446, a taken pointer BTB row index 448, and a taken pointer BTB column index 450. The not-taken pointer BTB row index 444 and the taken pointer BTB row index 448 each map to a row/congruence class of the BTB 204. The not-taken pointer BTB column index 446 and the taken pointer BTB column index 450 each map to a column/way of the BTB 204.

To better understand how a FIT is formed and managed using the FIT structure 200 of FIG. 2, consider the following example code that illustrates a code sequence including branch instructions.

--- start:
-
-
Branch A → (target 1)
-
-
-
Branch B → (start)
target 1:
-
-
Branch C → (target 2)
-
-
Branch D → (start)
target 2:
-
Branch E → (start)

---

Figure 5:
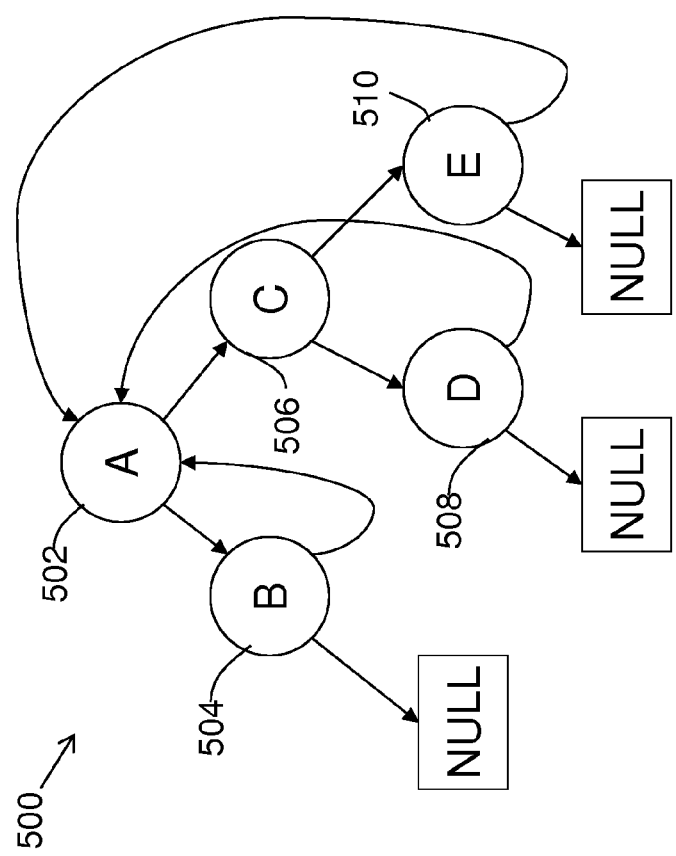
FIG. 5 depicts an example FIT in a tree representation according to an embodiment.

FIG. 5 illustrates how branches in the example code can be represented as a tree 500. In the tree representation, every branch in the code is represented by a node. Each node has a left child pointer and a right child pointer. The left child pointer points to a node representing the first branch encountered along the parent node's branch's not-taken path. The right child pointer points to a node representing the first branch encountered along the parent node's branch's taken path. A pointer is NULL (invalid) if that path from the parent node has never been encountered. In this example, node A 502 has a branch not-taken path to node B 504 and a branch taken path to node C 506. Node B 504 has a branch not-taken path of NULL and a branch taken path to node A 502. Node C 506 has a branch not-taken path to node D 508 and a branch taken path to node E 510. Node D 508 has a branch not-taken path of NULL and a branch taken path to node A 502. Node E 510 has a branch not-taken path of NULL and a branch taken path of node A 502. The NULL pointers from nodes B 504, D 508, and E 510 indicate that these branches were never predicted not-taken.

In the branch predictor 118 of FIG. 2 encountered branches of the example code above are installed into the BTB 204. Depending on the implementation, only a subset of branch occurrences may be installed. Continuing with the example, assume all encountered branches are installed into the BTB 204, which is assumed to be a 2-way set associative cache. The FIT structure 200 is faster to access than the BTB 204. In this example, the BTB 204 has a 4-cycle re-index loop when not under the direction of the FIT structure 200, as depicted in pipeline timing sequence 1020 for BTB search pipeline 1000 of FIG. 10. The FIT structure 200 has a 2-cycle re-index loop, as depicted in the example pipeline timing sequence 1102 of FIG. 11, so the FIT structure 200 is 2 cycles faster than the BTB 204. Because the FIT is faster to access than the BTB, once it takes control of the BTB search, it accelerates the BTB search pipeline to have a 2-cycle re-index loop as depicted in 1050 of FIG. 10.

Tables 1 and 2 show how the branches in the example code would be placed in the BTB 204 and the FIT structure 200. In this example, entries in the FIT CAM 206 indicate branch target nodes in rows and columns of the BTB 204 for each branch node. Entries in the FIT BTB pointers 212 map taken and not-taken paths of the nodes to rows and columns of the BTB 204. Entries in the FIT pointers 210 map taken and not-taken paths back to rows (FIT index values) of the FIT CAM 206.

TABLE 1

Example BTB states for example code
BTB 204

| Row | Col 0 | Col 1 |
|---|---|---|
| 0 | | |
| ... | | |
| 5 | A | B |
| ... | | |
| 200 | | C |
| 201 | D | |
| ... | | |
| 300 | E | |
| ... | | |

TABLE 2

Example FIT states for example code

| | FIT CAM 206 | FIT BTB Pointers 212 | | FIT Pointers 210 | |
|---|---|---|---|---|---|
| row | BTB location | NT | T | NT | T |
| 0 | A (5, 0) | B (5, 1) | C (200, 1) | 1 | 2 |
| 1 | B (5, 1) | — | A (5, 0) | — | 0 |
| 2 | C (200, 1) | D (201, 0) | E (300, 0) | 3 | 4 |
| 3 | D (201, 0) | — | A (5, 0) | — | 0 |
| 4 | E (300, 0) | — | A (5, 0) | — | 0 |

Figure 6:
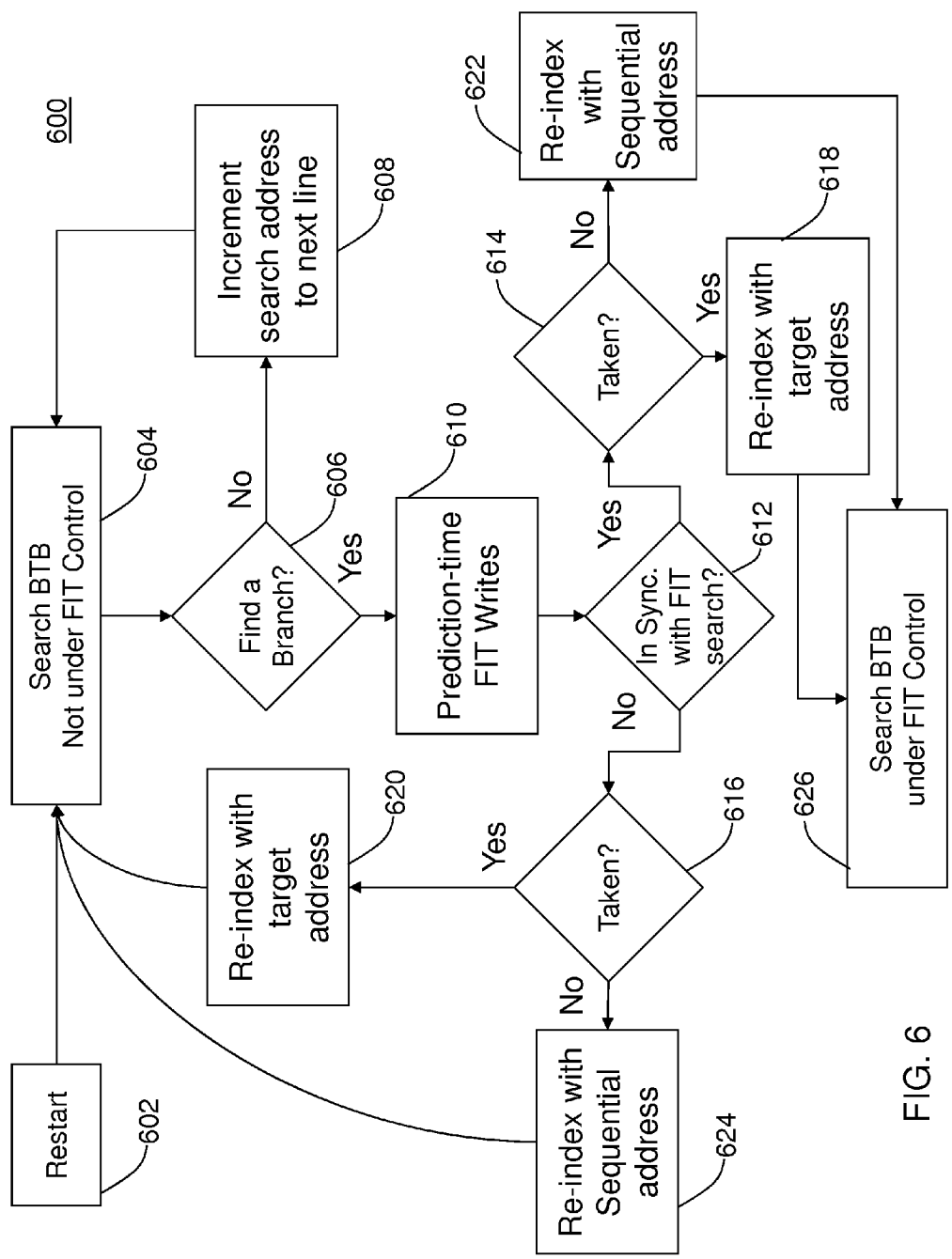
FIG. 6 is a flowchart illustrating a process for a BTB search transitioning to be under FIT control according to an embodiment.

FIG. 6 depicts how a BTB search process 600 operates when not under FIT control, with reference to FIG. 2. Upon a restart at block 602, the BTB search is not under FIT control at block 604. The BTB 204 is indexed with a restart address as the search address for search level 0. At block 606, if a branch is not found, the search address is incremented to the next line at block 608 and the search process begins again at block 604. If a branch is found, prediction-time FIT writes take place at block 610 as further described in reference to FIG. 7. At block 612, it is determined whether or not the FIT search is synchronized (in sync) with the BTB search. The searches are in sync for a prediction from BTB search level n whenever the FIT BTB pointer tree 214 has results from the FIT search for the same search level n. In either case if the branch is predicted taken at blocks 614 and 616, the BTB search is re-indexed with the predicted target address at block 618 and 620 respectively. If the branch is predicted not-taken at blocks 614 and 616, the BTB search is re-indexed with the sequential address at blocks 622 and 624 respectively. If the FIT search is not in sync with the BTB search at block 612, then the search process continues not under FIT control at block 604. If the FIT search is in sync with the BTB search at block 612, then the search process proceeds under FIT control at block 626 as described further in reference to FIG. 8.

Figure 7:
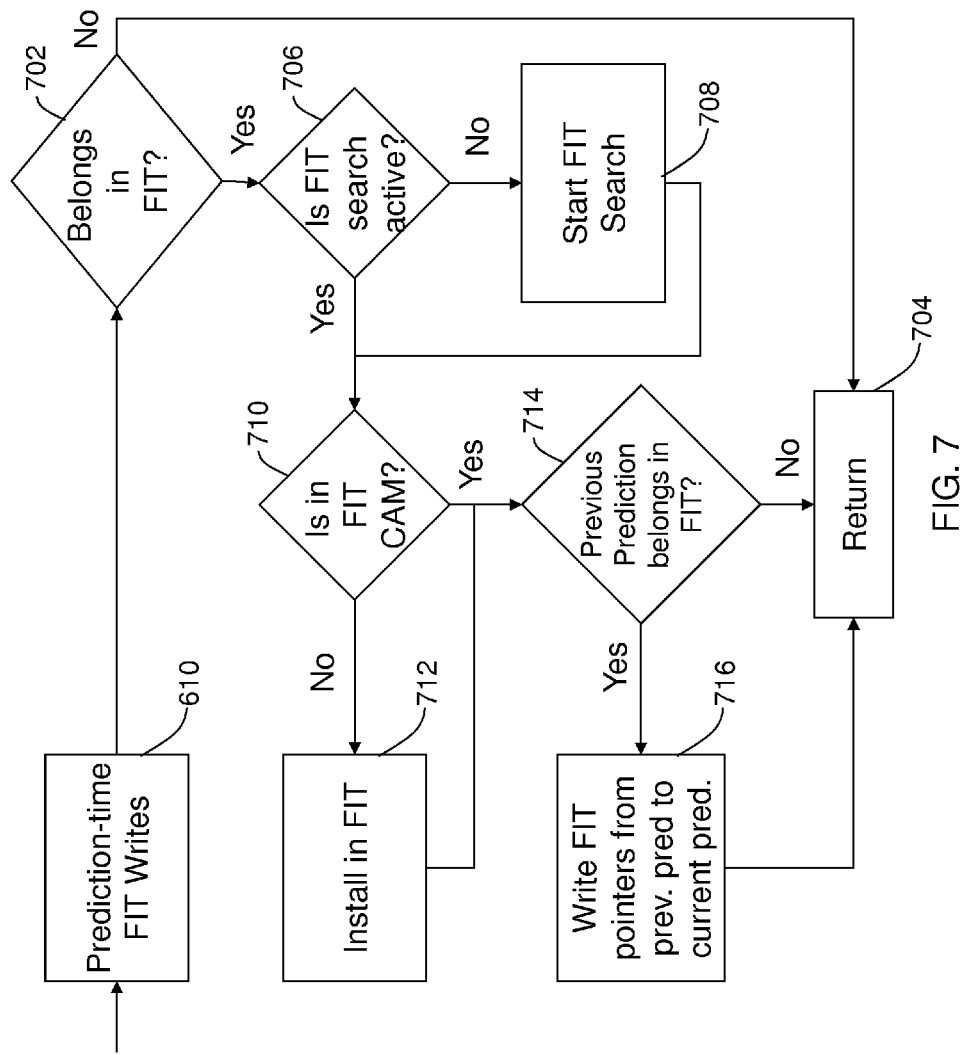
FIG. 7 is a flowchart illustrating a process for prediction-time FIT writes while the BTB search is not under FIT control according to an embodiment.

FIG. 7 shows how prediction-time FIT writes occur when the BTB search is not under FIT control. FIG. 7 continues from block 610 of process 600 of FIG. 6. At block 702, if the current prediction does not belong in the FIT structure 200, then no action occurs and the process flow returns at block 704. Certain types of branches can be defined as not qualifying for FIT-acceleration. One such example is a branch which exhibits multiple targets. Upon recognizing a mispredicted target address, a bit indicating a multi-target branch can be written to '1' in the BTB 204. Upon predicting such a branch, it can be recognized that the branch does not belong in the FIT structure 200 by seeing that the value of the multi-target-branch bit is 1. For branches that belong in the FIT structure 200, if the FIT search is not currently active at block 706, it is activated at block 708. The FIT search process is further described in reference to FIG. 9. For a predicted branch that belongs in the FIT structure 200, the FIT CAM 206 is interrogated to see whether the branch is in the FIT structure 200 at block 710. If it is not, the branch is installed in the FIT structure 200 at block 712. At block 714, if a previous branch prediction also belongs in the FIT structure 200, then a FIT pointer from the previous branch prediction to the current branch predicted is written to the FIT structure 200 at block 716.

Figure 8:
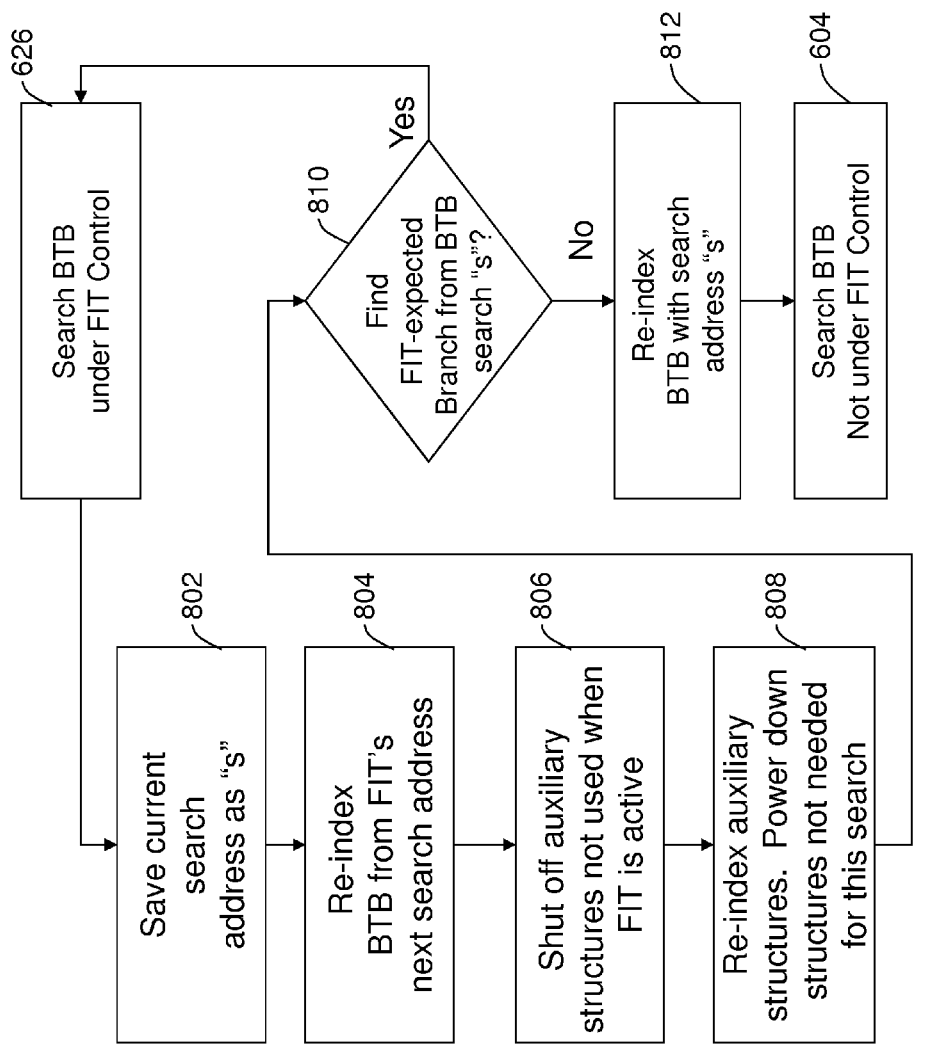
FIG. 8 is a flowchart illustrating a process for a BTB search while under FIT control according to an embodiment.

FIG. 8 depicts how the BTB search operates while under FIT control. FIG. 8 continues from block 626 of process 600 of FIG. 6. At block 802, the current search address is saved as "s". The current search level is called "n". At block 804, the BTB search is re-indexed for search level n+1 from the FIT search results from level n. The BTB search uses at least 2 read ports in the BTB 204 in order to be indexed before the results of the level n search are known. One read port assumes that level n is not-taken. The other read port assumes level n is taken. If the level n−1 prediction is known, then 2 read ports are sufficient in the BTB 204. If level n−1 prediction is not yet known, then 4 read ports would be necessary in the BTB 204. In the example pipeline timing sequence 1020 of FIG. 10, where BTB search pipeline 1000 of FIG. 10 includes an index cycle, a look1 cycle, a look2 cycle, a hit1 cycle, a hit2 cycle, and a prediction cycle, 2 BTB read ports are sufficient for BTB 204 if the direction of a predicted branch is known in the hit2 cycle.

At blocks 806 and 808, while re-indexing, auxiliary structures not used while the FIT structure 200 is active, such as MTT 216 and PHT 218, can be shut-off/depowered. In the case of the MTT 216, branches which exhibit multiple targets are excluded from being written into the FIT structure 200 as previously described. The FIT pointers 210 can include an indication whether the next-to-be-predicted branch could use the PHT 218. This is '1' if the next-to-be-predicted branch has ever been written into the PHT 218. If the next-to-be-predicted branch has been written into the PHT 218, then the PHT 218 must be powered up. If the next-to-be-predicted branch has never been written into the PHT 218, then the PHT 218 is powered down. When under FIT control if the PHT 218 is powered down because of the FIT structure 200, and the BTB 204 indicates that the branch has been written into the PHT 218 in the past, then the FIT pointer PHT-usage information is updated to match the information in the BTB 204. Similarly if the FIT structure 200 indicates the PHT 218 is needed, but the BTB 204 indicates that the PHT 218 is not needed, then the FIT indication is updated to match that of the BTB 204. One way that this second case could occur is if a branch had been qualified to use the PHT 218 for some time, but then was purged out of the PHT 218 by clearing the BTB entry's indication that the PHT should be used for this branch.

At block 810, it is determined if the search for search address "s" does not find a prediction in the BTB 204 row and column that the FIT structure 200 expected. This can occur because the FIT structure 200 predictions do not always match that of the BTB 204, since a BTB state could change after having written the information into the FIT structure 200. Also the FIT structure 200 may not have had any information along the predicted path if it encountered a dead end. At block 810, if the FIT-expected branch is not found in the BTB search or there is no FIT-expected branch due to a FIT dead end upon encountering a FIT NULL pointer along the BTB-predicted path, then at block 812, the BTB search is re-indexed with search address "s". Flow returns to block 604, where the BTB search is not under FIT control. At block 810, if the FIT-expected branch is found in the BTB 204, then the BTB search continues under FIT control at block 626. When the BTB search is under FIT control, BTB hits are only detected in the FIT-specified column.

Figure 9:
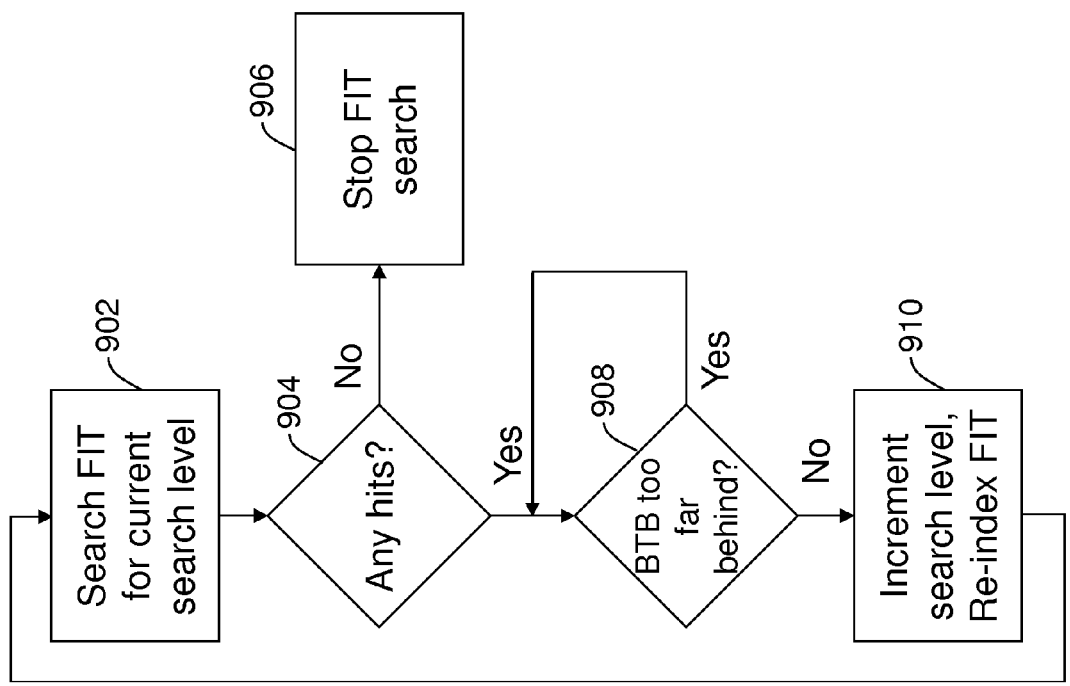
FIG. 9 is a flowchart illustrating a process for a FIT search according to an embodiment.

FIG. 9 depicts how a FIT search occurs. As previously described in reference to FIG. 7, the FIT search is started at block 708 of FIG. 7 based on finding a prediction that belongs in the FIT structure 200 when searching the BTB 204 not under FIT control, and the FIT search was not already active. When the FIT search is active, the FIT structure 200 is searched for the current search level at block 902 of FIG. 9. When starting up the FIT search address is the FIT index corresponding to the BTB 204 row and column of the predicted branch. There are FIT hits whenever any of the pointers from the FIT entries being searched are valid (non-NULL). At block 904, if there are no hits, this is a FIT dead end and the FIT search is stopped at block 906. At block 904, if there are hits, then as long as the BTB is not too far behind at block 908 (within a predetermined number of search levels), the FIT search level is incremented and the FIT is re-indexed for all of the relevant hits at block 910. The FIT structure 200 therefore requires multiple read ports. To implement the example pipeline timing sequence 1050 shown in FIG. 10, 4 read ports in the FIT are sufficient. This can result in up to 8 hits representing branches in search level n+1 from search level n. The prediction for search level n−2 prunes down the number of hits. The BTB 204 is too far behind at block 908 if it has not yet provided a prediction from search level n−2. In that case, the FIT structure 200 cannot be re-indexed yet. In each cycle, reassessment is performed to determine whether the BTB search has caught up. The BTB index pointers and power save information from a FIT search can be stored in the FIT BTB pointer tree 214.

Figure 10:
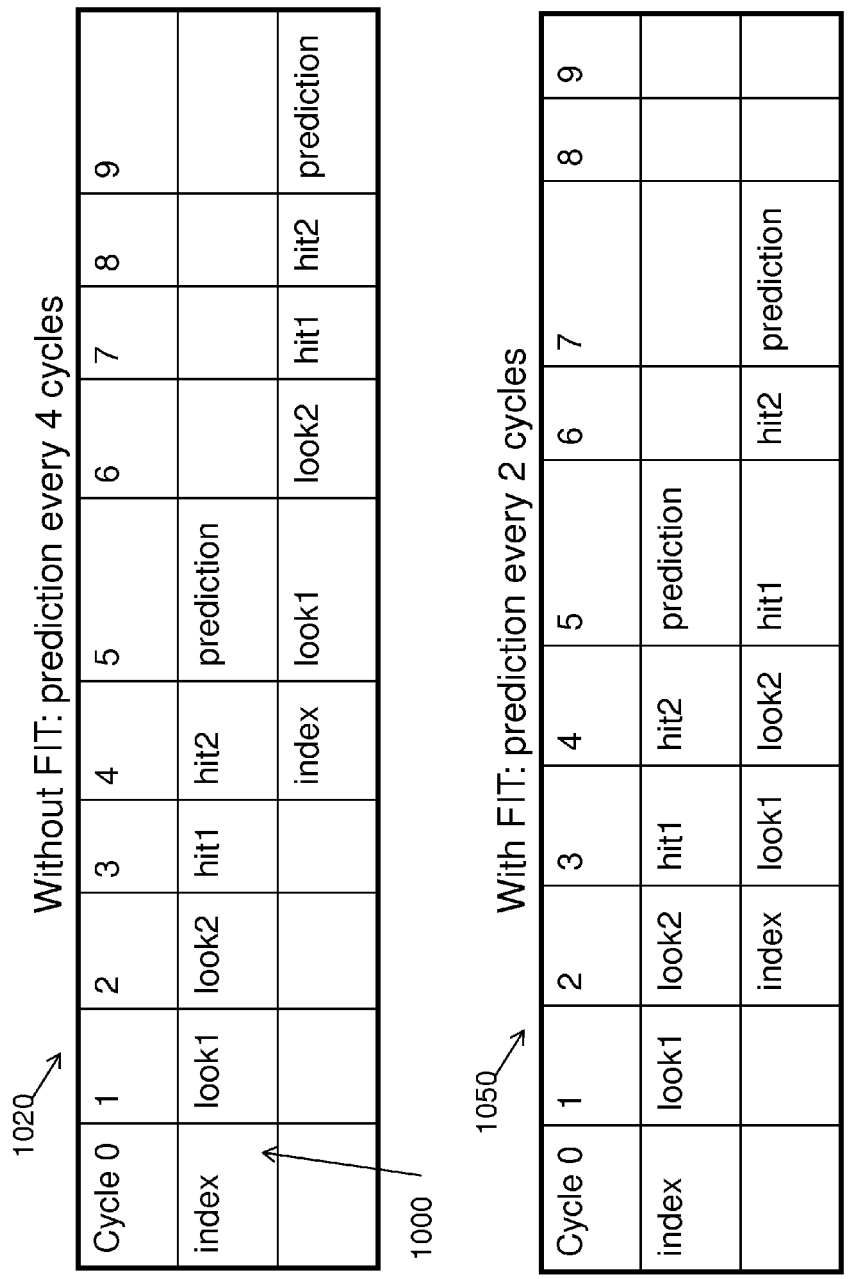
FIG. 10 depicts example branch prediction pipeline timing sequences according to an embodiment.

FIG. 10 depicts example branch prediction pipeline timing sequences 1020, 1050 without the FIT and with the FIT for BTB search pipeline 1000. In this example, the pipeline timing sequence 1020 without the FIT, upon a predicted branch (taken or not-taken) the BTB 204 is re-indexed 4 cycles after the initial index (cycle 4 vs. cycle 0). This occurs after the BTB 204 and auxiliary prediction arrays (such as PHT 218 and MTT 216) have been read, a predicted branch has been found, and a direction and target prediction have been made. This timing sequence 1020 for the BTB search pipeline 1000 provides one branch prediction every 4 cycles. The FIT accelerates the re-index by 2 cycles as depicted in the pipeline timing sequence 1050, thereby providing one branch prediction every 2 cycles when predicting branches that are in the FIT structure 200. The re-index occurs before it is known whether the first branch is predicted taken or not-taken (cycle 2). Therefore, the BTB 204 is indexed along both paths with BTB index information that comes from the FIT structure 200.

FIG. 11 depicts an example pipeline timing sequence 1102 for a FIT search pipeline 1100 that corresponds with the pipeline timing sequence 1050 for the BTB search pipeline 1000 in FIG. 10. The FIT pointers 210 are indexed in the f0 cycle. The results are read out of the FIT structures 200 in the f1 cycle. The FIT structure 200 is re-indexed for the next search level in the f2 cycle. In this example, the FIT structure 200 contains 4 read ports. During the f1 cycle, the results of the FIT search are written into the FIT BTB pointer tree 214. For search level 0, the f0 cycle occurs at cycle 0, the f1 cycle occurs at cycle 1, the f2 cycle occurs at cycle 2. For search level 1, the f0 cycle occurs at cycle 2, overlapping in time with cycle f2 of search level 0, while the f2 cycle of search level 1 occurs at cycle 4. For search level 2, the f0 cycle occurs at cycle 4, overlapping in time with cycle f2 of search level 1, while the f2 cycle of search level 2 occurs at cycle 6.

Figure 12:
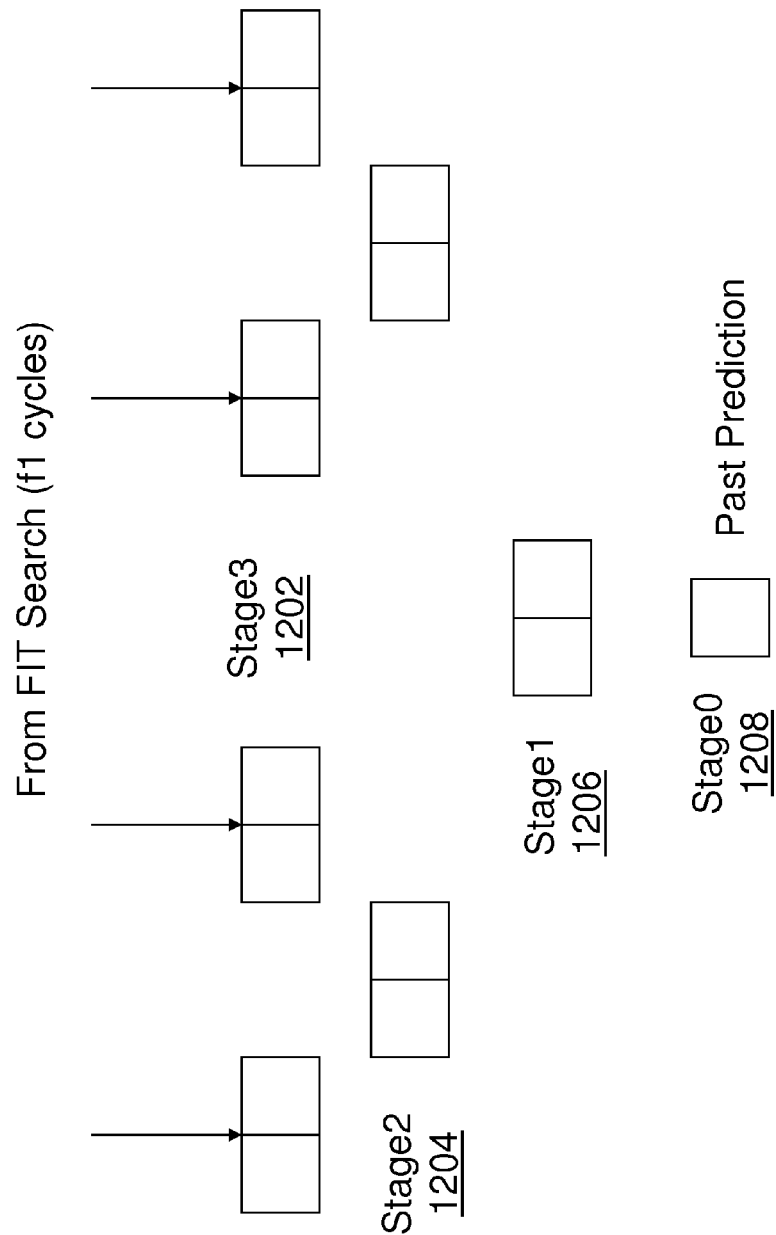
FIG. 12 depicts an example FIT BTB pointer tree according to an embodiment.

FIG. 12 depicts an example FIT BTB pointer tree 214 to support the BTB search pipeline 1000 and FIT search pipeline 1100 of FIGS. 10 and 11. In the f1 cycles from FIT search pipeline 1100, FIT search results are written into stage3 1202. Stage3 1202 information is written into stage2 1204, stage1 1206, or stage0 1208 depending on the state of the BTB search. Similarly stage2 1204 is written into either stage1 1206 or stage0 1208. Stage1 1206 is written into stage 0 1208. Each stage 1202-1208 represents a search level. Stage0 1208 represents the search level that has already been predicted (past prediction), also referred to as search level x. Stage1 1206 contains FIT results from the FIT search for search level x. Therefore, stage1 1206 contains both NotTaken and Taken FIT BTB pointers from search level x. This is the index information used to index for search level x+1. Similarly stage2 1204 contains FIT BTB pointers from search level x+1 to level x+2.

Figure 13:
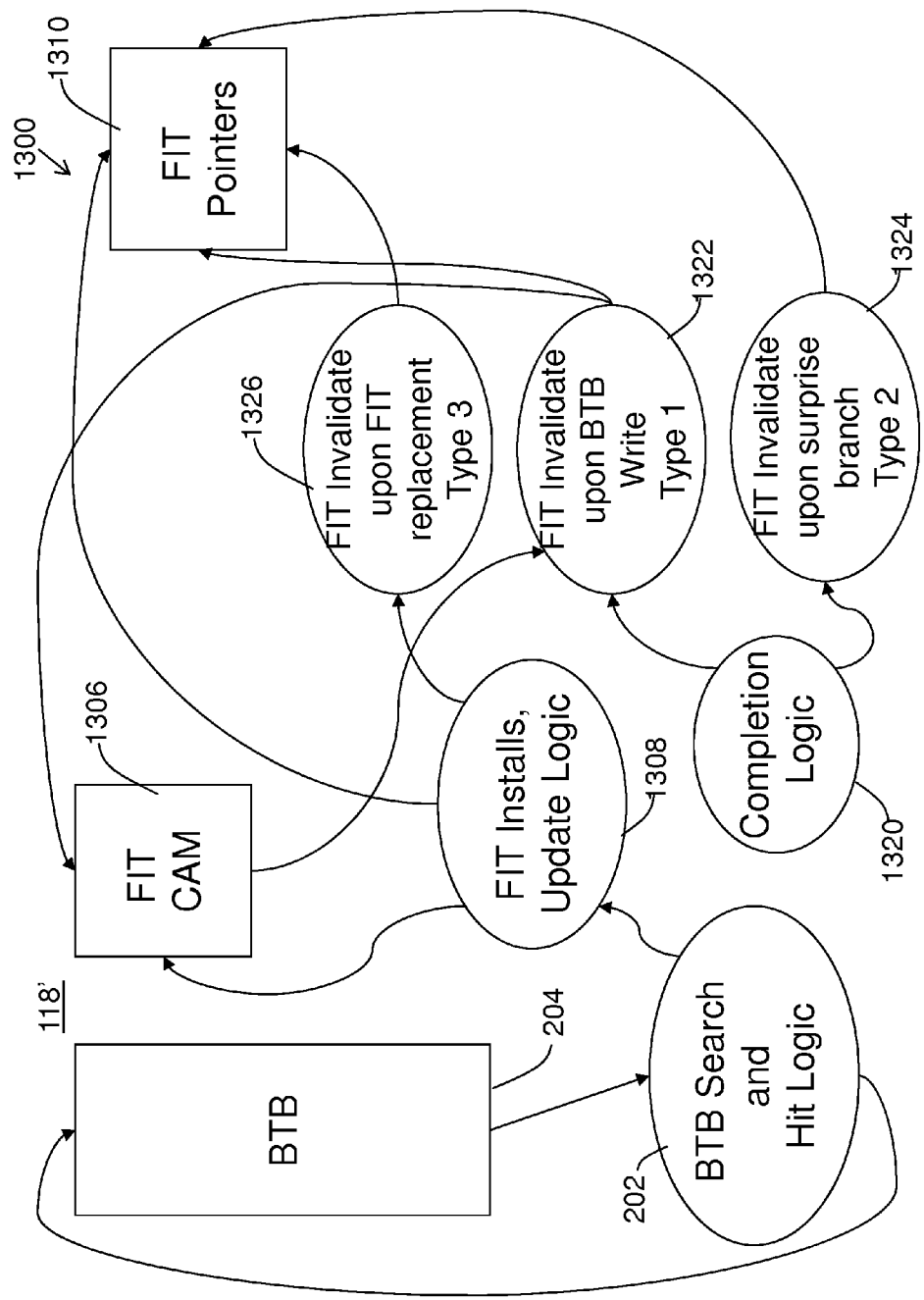
FIG. 13 depicts logic to selectively invalidate FIT structures for BTB synchronization according to an embodiment.

FIG. 13 depicts logic to selectively invalidate FIT structures for BTB synchronization. Branch predictor 118' of FIG. 13 is an alternate embodiment of branch predictor 118 of FIG. 2, and may be an extension of branch predictor 118 of FIG. 2. Similar to the branch predictor 118 of FIG. 2, the branch predictor 118' includes BTB search and hit logic 202 and BTB 204. Also similar to the branch predictor 118 of FIG. 2, the branch predictor 118' can include (not depicted): FIT BTB pointer tree 214, MTT 216, and PHT 218. A portion of a FIT structure 1300 is depicted in FIG. 13 and includes FIT CAM 1306 and FIT pointers 1310. The FIT CAM 1306 and FIT pointers 1310 are similar to the FIT CAM 206 and FIT pointers 210 of FIG. 2, but are updated/modified by additional invalidation logic. The branch predictor 118' also includes FIT install and update logic 1308, completion logic 1320, FIT invalidate upon BTB write (type 1) invalidation logic 1322, FIT invalidate upon surprise branch (type 2) invalidation logic 1324, and FIT invalidate upon FIT replacement (type 3) invalidation logic 1326. The type 1 invalidation logic 1322 can invalidate entries in the FIT CAM 1306 and in the FIT pointers 1310. The type 2 and type 3 invalidation logic 1324 and 1326 can invalidate entries in the FIT pointers 1310. The type 1 and type 2 invalidation logic 1322 and 1324 are controlled by completion logic 1320. The type 3 invalidation logic 1326 is controlled by the FIT install and update logic 1308. Types 1 and 2 occur at the time of BTB writes to the BTB 204, which may be at completion time but need not be so. Type 3 invalidates occur upon a FIT install which replaces/overwrites an old FIT entry. The type 1, type 2, and type 3 invalidation logic 1322, 1324, and 1326 can be implemented in parallel.

The entry format of the FIT CAM 1306 may be the same as that depicted for FIT CAM entry 400 of FIG. 4. Similarly, the entry format of the FIT pointers 1310 may be the same as that depicted for FIT pointer table entry 420 of FIG. 4. Again, the FIT CAM valid field 402 of FIG. 4 indicates whether an associated FIT entry is valid. The not-taken pointer valid field 422 and taken pointer valid field 426 indicate validity of an associated pointer, where an invalid pointer can be represented as NULL. The type 1, type 2, and type 3 invalidation logic 1322, 1324, and 1326 can modify the valid fields 402, 422, and 426 to selectively invalidate FIT entries as further described herein.

Figure 14:
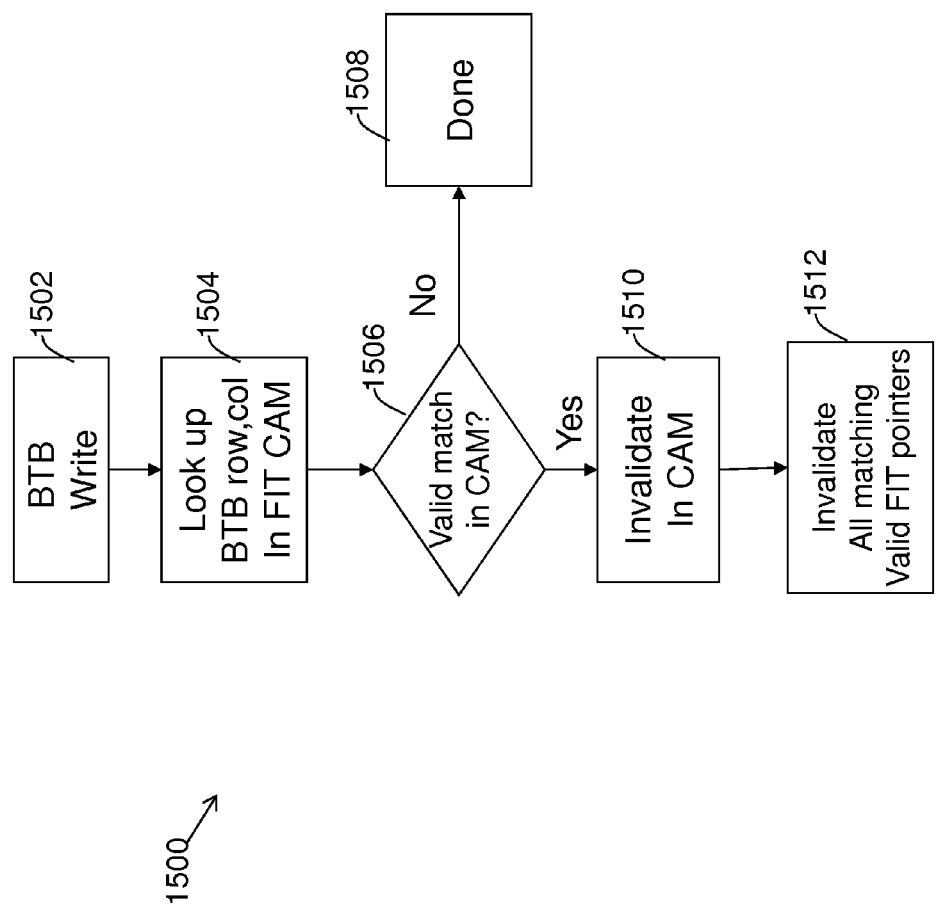
FIG. 14 is a flowchart illustrating a process for implementing FIT invalidate upon BTB write (type 1) invalidation logic according to an embodiment.

FIG. 14 depicts an example of a process 1500 for implementing FIT invalidate upon BTB write (type 1) invalidation logic 1322 of FIG. 13. Type 1 FIT invalidation occurs in response to BTB writes. At block 1502, upon a BTB write to BTB 204, which may be either a new install replacing an old BTB entry, or is an update of prediction information such as the target address, information in the FIT structure 1300 referencing this location in the BTB 204 becomes stale. To invalidate any such information, the FIT CAM 1306 is accessed at block 1504 with the BTB row and column index to determine whether or not the over-written BTB entry is in the FIT structure 1300. A valid CAM match occurs at block 1506 if an entry in the FIT CAM 1306 is valid and has the same BTB row and column as the BTB write. This CAM lookup also provides the corresponding FIT index. If it is in the FIT structure 1300, the corresponding FIT CAM valid field 402 is invalidated at block 1510. Also the FIT index returned from the CAM lookup is compared against all of the FIT pointer values in the FIT pointer table 1310. All valid FIT pointers which match are invalidated at block 1512. For example, the corresponding not-taken pointer valid field 422 and/or taken pointer valid field 426 fields can be set to 0. At block 1506, if a valid match is not found in the FIT CAM 1306, then the process 1500 is done at block 1508.

Figure 15:
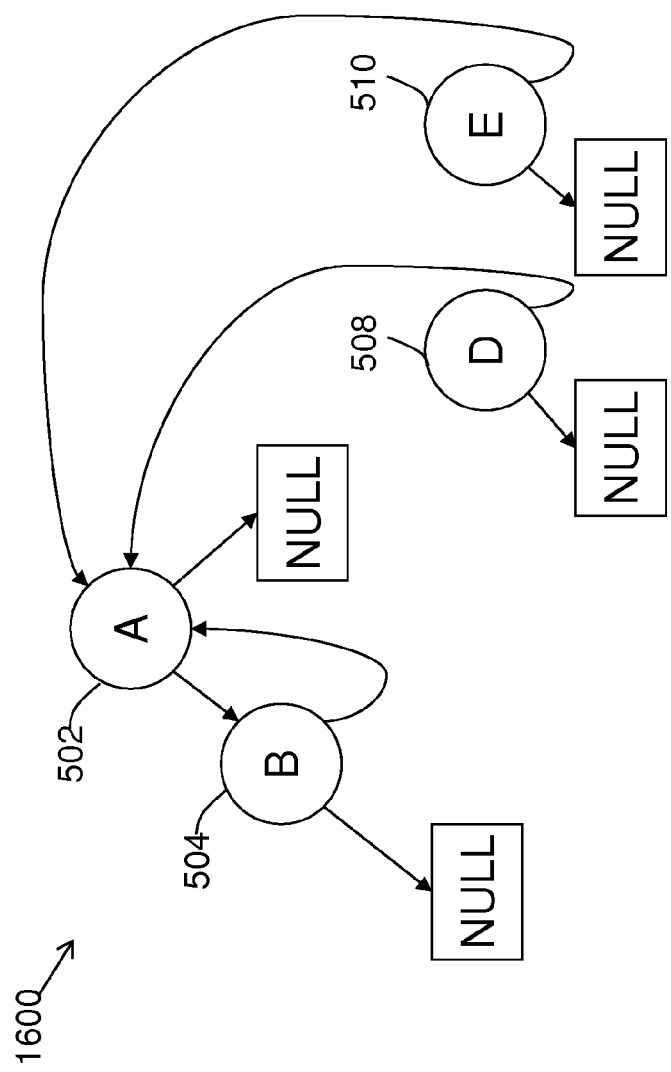
FIG. 15 depicts an example FIT in a tree representation after node removal according to an embodiment.

To better illustrate type 1 invalidation logic 1322 and the process 1500 of FIG. 14 by example, consider the previous example described in reference to Tables 1 and 2 and FIG. 5 as a starting point for BTB 204 and the states of the FIT CAM 1306 and FIT pointers 1310 align with states of the FIT CAM 206 and FIT pointers 210, with validities set accordingly. Suppose a BTB write occurs, which replaces branch "C" with a branch "F" in the BTB 204. Branch C (node C 506) was in BTB row 200, column 1 in Table 1. A lookup in the FIT CAM 1306 is performed. A valid match is found in FIT CAM index 2. Therefore, FIT CAM index 2 is invalidated. In FIT pointers 1310, the taken pointer from FIT index 0 pointed to FIT index 2 (for node C 506); therefore, the taken pointer at FIT index 0 is invalidated. Tables 3 and 4 provide examples of the state of the BTB 204 and FIT structure 1300 after the type 1 invalidation logic 1322 has been performed based on the replacement of branch "C" in the BTB 204 by branch "F". FIG. 15 illustrates the removal of node C 506 from tree 1600 based on tree 500 of FIG. 5.

TABLE 3

Example BTB states after branch "C" is replaced by branch "F" BTB 204

| row | Col 0 | Col 1 |
|---|---|---|
| 0 | | |
| ... | | |
| 5 | A | B |
| ... | | |
| 200 | | F |
| 201 | D | |
| ... | | |
| 300 | E | |
| ... | | |

TABLE 4

Example FIT states after invalidation of branch "C"

| | | FIT CAM 1306 | FIT BTB Pointers 212 | | FIT Pointers 1310 | |
|---|---|---|---|---|---|---|
| row | BTB location | | NT | T | NT | T |
| 0 | A (5, 0) | | B (5, 1) | — | 1 | — |
| 1 | B (5, 1) | | — | A (5, 0) | — | 0 |
| 2 | — | | — | — | — | — |
| 3 | D (201, 0) | | — | A (5, 0) | — | 0 |
| 4 | E (300, 0) | | — | A (5, 0) | — | 0 |

Figure 16:
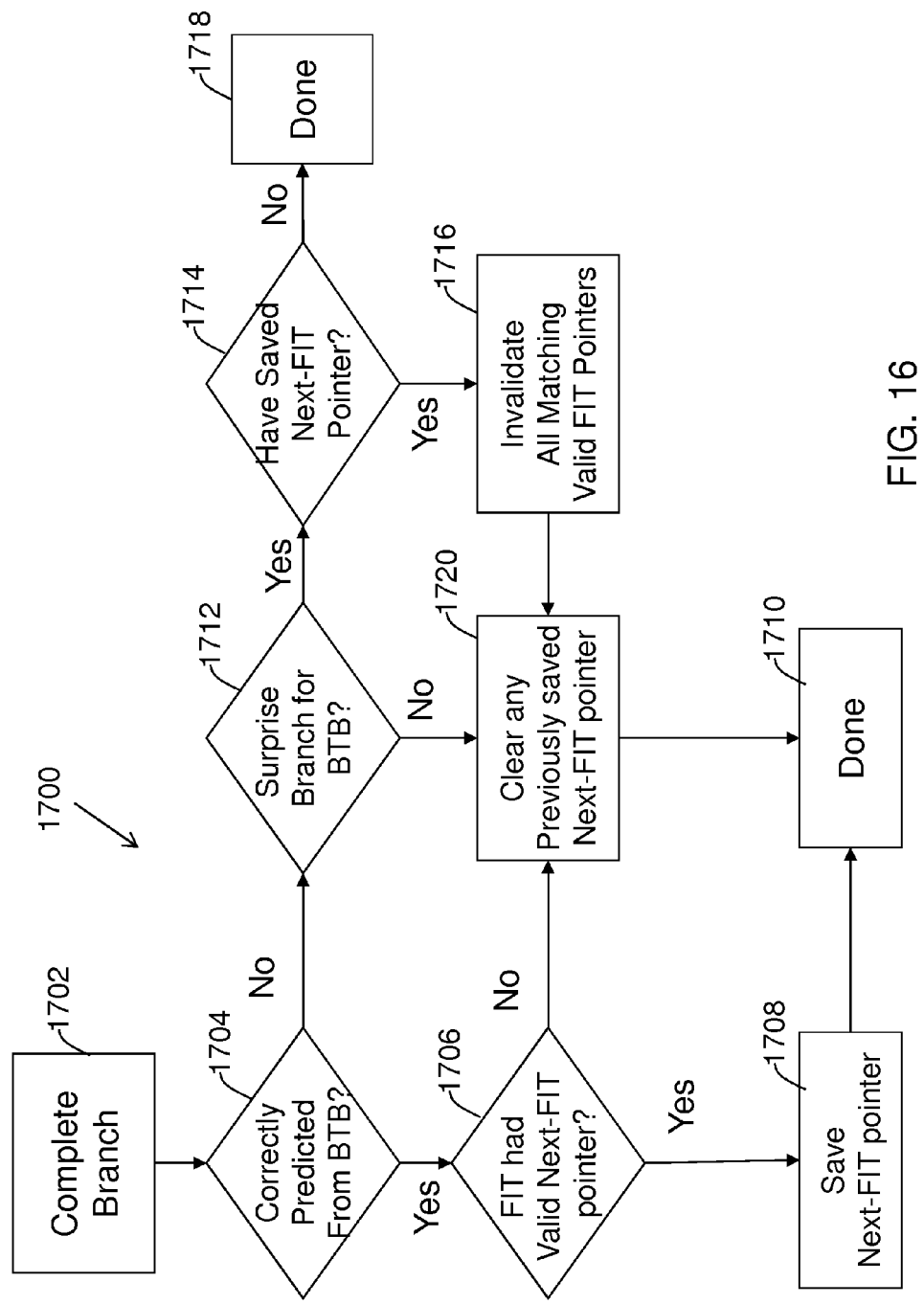
FIG. 16 is a flowchart illustrating a process implementing FIT invalidate upon surprise branch (type 2) invalidation logic according to an embodiment.

FIG. 16 depicts an example of a process 1700 for implementing FIT invalidate upon surprise branch (type 2) invalidation logic 1324 of FIG. 13. Type 2 FIT invalidation occurs in response to encountering a surprise branch along a FIT-predicted path. A surprise branch is a branch for which the BTB 204 does not provide a prediction. This can happen if the branch has never been installed in the BTB 204. It can also happen if a stale FIT pointer caused the prediction to be missed. Upon completing a correctly predicted branch, at block 1702 and 1704, that was accelerated by the FIT structure 1300 and had a valid FIT pointer along the predicted path at block 1706, the next-FIT pointer is saved at block 1708, and process 1700 is done at block 1710. If the next completed branch is a surprise branch, at block 1712, that belongs in the BTB 204 (such as a resolved taken branch), then type 2 FIT invalidation occurs. At block 1714, it is determined whether there is a saved next-FIT pointer. Any valid FIT pointer with a value matching that of the saved next-FIT pointer is invalidated at block 1716; otherwise, the process 1700 is done at block 1718. If at block 1706, the FIT structure 1300 did not have a valid next-FIT pointer or at block 1712 there was no surprise branch or if block 1716 is performed, any previously saved next-FIT pointer is cleared at block 1720 and the process 1700 completes at block 1710.

Figure 17:
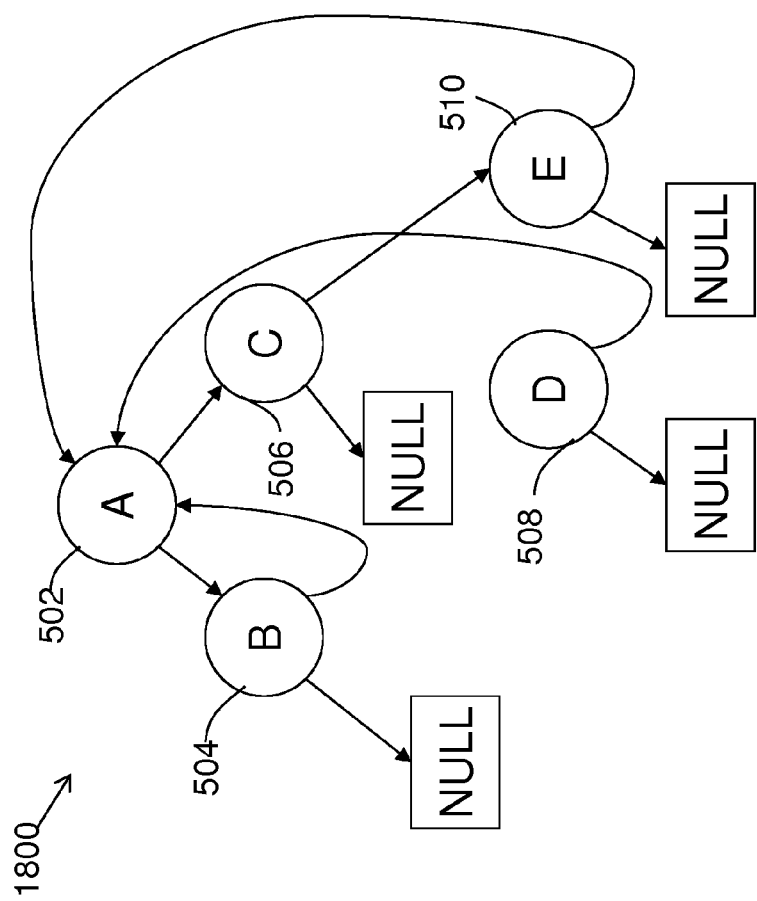
FIG. 17 depicts an example FIT in a tree representation after path modification according to an embodiment.

To better illustrate type 2 invalidation logic 1324 and the process 1700 of FIG. 16 by example, consider the previous example described in reference to Tables 1 and 2 and FIG. 5 as a starting point for BTB 204 and the states of the FIT CAM 1306 and FIT pointers 1310 align with states of the FIT CAM 206 and FIT pointers 210, with validities set accordingly. Suppose a surprise branch "G" is encountered along the Not-Taken path of branch "C" (node C 506). Upon completing a FIT-influenced predicted occurrence of branch "C", it has a valid next-FIT pointer. The value of the next-FIT pointer is 3, pointing to node D 508. The next-FIT pointer value is saved. Upon completion of the surprise taken branch "G", it belongs in the BTB 204 and it has a saved next-FIT pointer. Accordingly, all matching valid FIT pointers (value=3) are invalidated in FIT pointers 1310. Specifically, the NotTaken pointer from node C 506 to node D 508 is invalidated. Tables 5 and 6 provide examples of the state of the BTB 204 and FIT structure 1300 after the type 2 invalidation logic 1324 has been performed after the surprise branch "G" on the NotTaken path of branch "C". FIG. 17 illustrates the removal of node D 508 from the NotTaken path of node C 506 in tree 1800 based on tree 500 of FIG. 5.

TABLE 5

Example BTB states after surprise branch "G"
BTB 204

| row | Col 0 | Col 1 |
|-----|-------|-------|
| 0 | | |
| ... | | |
| 5 | A | B |
| ... | | |
| 200 | G | C |
| 201 | D | |
| ... | | |
| 300 | E | |
| ... | | |

TABLE 6

Example FIT states after surprise branch "G" on NotTaken path of branch "C"

| row | BTB location | FIT BTB Pointers 212 NT | FIT BTB Pointers 212 T | FIT Pointers 1310 NT | FIT Pointers 1310 T |
|-----|--------------|-----|-----|-----|-----|
| 0 | A (5, 0) | B (5, 1) | C (200, 1) | 1 | 2 |
| 1 | B (5, 1) | — | A (5, 0) | — | 0 |
| 2 | C (200, 1) | — | E (300, 0) | — | 4 |
| 3 | D (201, 0) | — | A (5, 0) | — | 0 |
| 4 | E (300, 0) | — | A (5, 0) | — | 0 |

Figure 18:
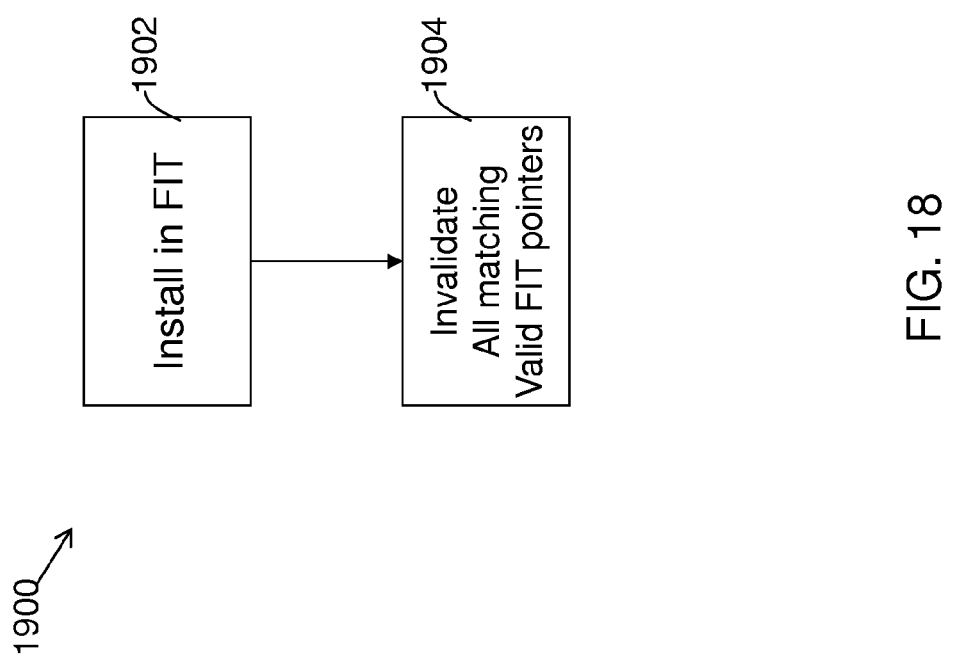
FIG. 18 is a flowchart illustrating a process implementing FIT invalidate upon FIT replacement (type 3) invalidation logic according to an embodiment.

FIG. 18 depicts an example of a process 1900 for implementing the FIT invalidate upon FIT replacement (type 3) invalidation logic 1326 of FIG. 13. Type 3 FIT invalidation occurs based on writing the FIT CAM 1306 with a newly encountered branch prediction that was not previously in the FIT structure 1300 but belongs there. A FIT entry to remove (e.g., a victim) is chosen by a replacement algorithm, such as least recently used (LRU) or pseudo-LRU. At block 1902, the new FIT entry is installed in the FIT structure 1300. At block 1904, any valid pointers with a matching pointer value pointing to the new FIT entry are invalidated.

Figure 19:
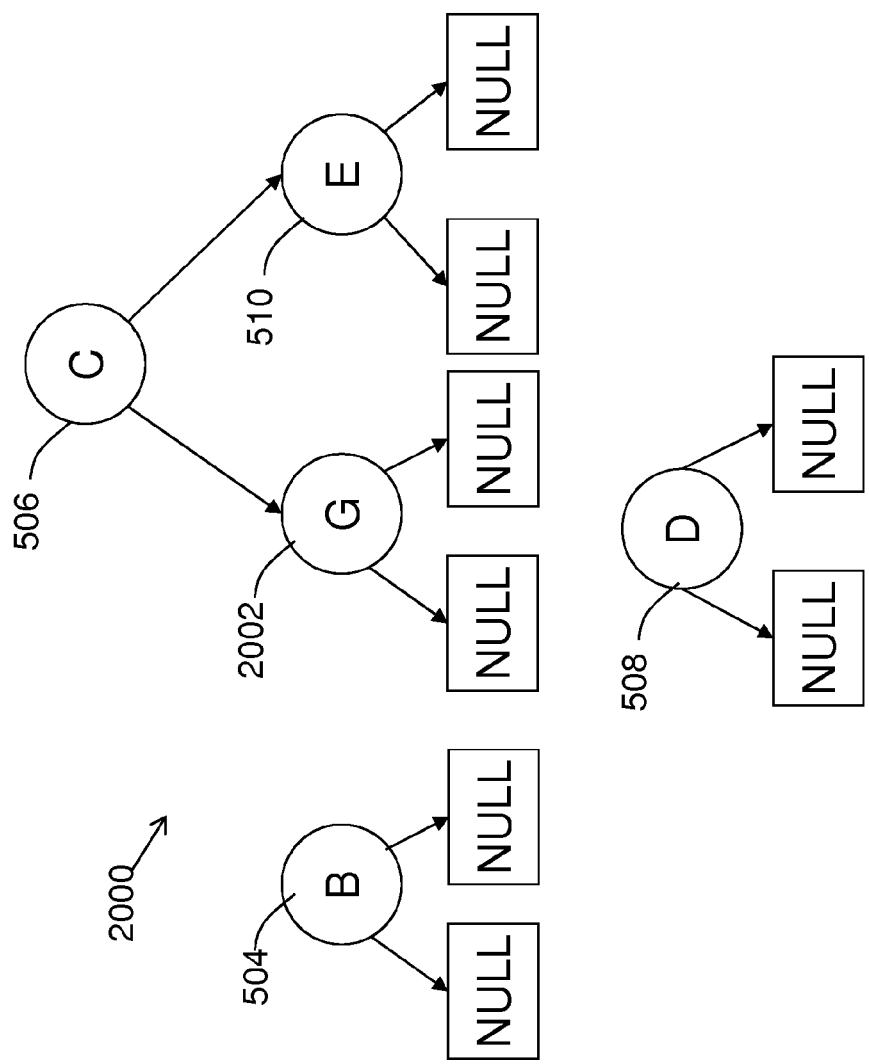
FIG. 19 depicts an example FIT in a tree representation after node replacement according to an embodiment.

To better illustrate type 3 invalidation logic 1326 and the process 1900 of FIG. 18 by example, consider the previous example described in reference to Tables 5 and 6 and FIG. 17 as a starting point for BTB 204 and states of the FIT CAM 1306, FIT BTB pointers 212, and FIT pointers 1310 based on surprise branch "G". Suppose branch "C" (node C 506) is subsequently predicted NotTaken. This is followed by a Taken prediction of branch "G". Assuming branch "G" qualifies for being installed in the FIT structure 1300, it is written into whichever FIT location is chosen for replacement. In this example, FIT index 0 is chosen for replacement, which was the FIT entry for branch "A" (node A 502). All pointers pointing to FIT index 0 are invalidated. Specifically these are the taken pointers from the FIT entries representing branches "B", "D", and "E". "G" is installed into FIT index 0. The NotTaken pointer from branch "C" is updated to point to branch "G". Table 7 provides examples of the state of the FIT structure 1300 after the type 3 invalidation logic 1326 has been performed where the surprise branch "G" replaces branch "A". FIG. 19 illustrates the removal of node A 502 and the install of node G 2002 to the NotTaken path of node C 506 in tree 2000 based on tree 1800 of FIG. 17.

TABLE 7

Example FIT states after surprise branch "G" replaces branch "A"

| row | BTB location | FIT BTB Pointers 212 NT | FIT BTB Pointers 212 T | FIT Pointers 1310 NT | FIT Pointers 1310 T |
|-----|--------------|-----|-----|-----|-----|
| 0 | G (200, 0) | — | — | — | — |
| 1 | B (5, 1) | — | — | — | — |
| 2 | C (200, 1) | G (200, 0) | E (300, 0) | 0 | 4 |
| 3 | D (201, 0) | — | — | — | — |
| 4 | E (300, 0) | — | — | — | — |

Figure 20:
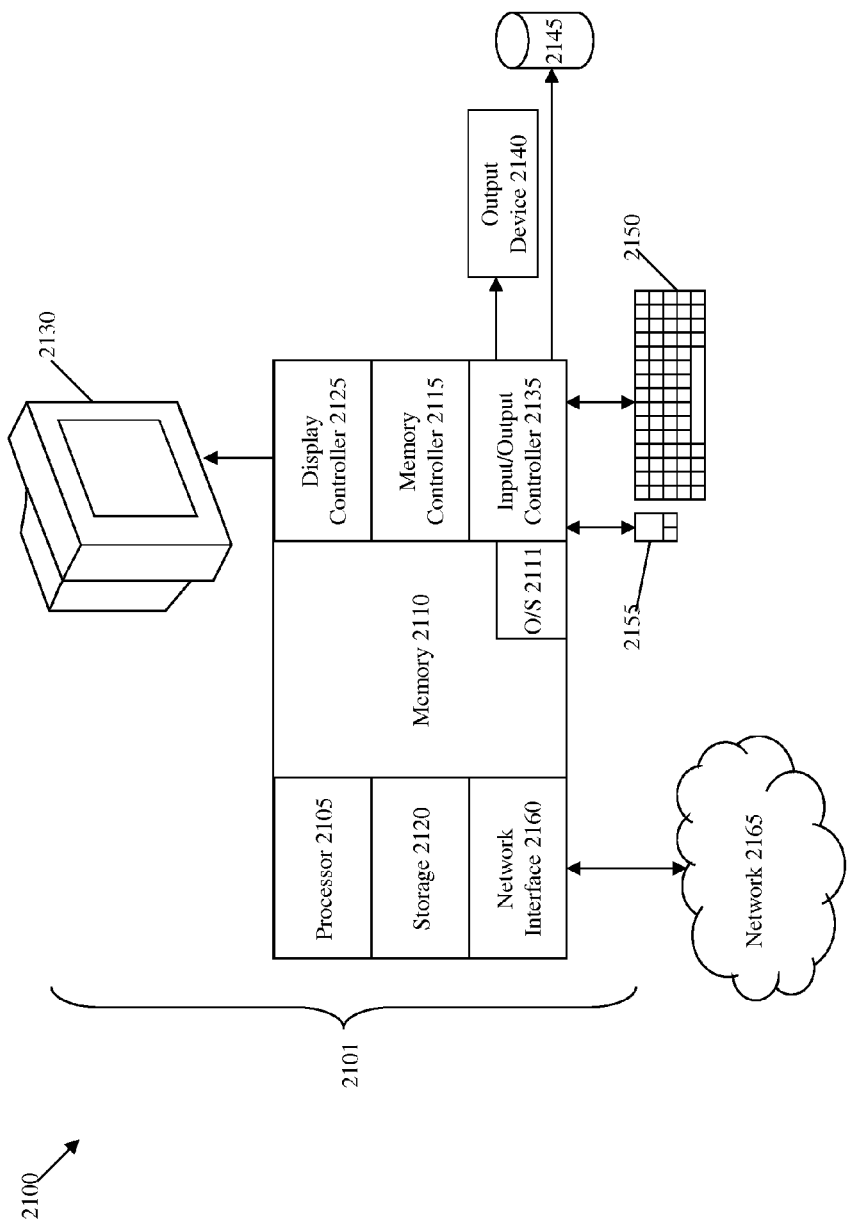
FIG. 20 depicts a computing system according to an embodiment.

FIG. 20 depicts a block diagram of a system 2100 for a fast index tree branch predictor in a processor 2105. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 2100 therefore includes general-purpose computer 2101 as illustrated in FIG. 20.

In an exemplary embodiment, in terms of hardware architecture, as shown in FIG. 20, the computer 2101 includes a processor 2105 which is a processing circuit that includes the processing pipeline 106 of FIG. 1 and a branch predictor 118, 118'. The computer 2101 further includes memory 2110 coupled to a memory controller 2115, and one or more input and/or output (I/O) devices 2140, 2145 (or peripherals) that are communicatively coupled via a local input/output controller 2135. The input/output controller 2135 can be, for example but not limited to, one or more buses or other wired or wireless connections, as is known in the art. The input/output controller 2135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 2105 is a hardware device for executing software, particularly that stored in storage 2120, such as cache storage, or memory 2110. The processor 2105 can be any custom made or commercially available processor, a central processing unit (CPU), an auxiliary processor among several processors associated with the computer 2101, a semiconductor based microprocessor (in the form of a microchip or chip set), a macroprocessor, or generally any device for executing instructions.

The memory 2110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 2110 may incorporate electronic, magnetic, optical, and/or other types of storage media. Note that the memory 2110 can have a distributed architecture, where various components are situated remote from one another, but can be accessed by the processor 2105.

The instructions in memory 2110 may include one or more separate programs, each of which comprises an ordered listing of executable instructions for implementing logical functions. In the example of FIG. 20, the instructions in the memory 2110 a suitable operating system (OS) 2111. The operating system 2111 essentially controls the execution of other computer programs and provides scheduling, input-output control, file and data management, memory management, and communication control and related services.

In an exemplary embodiment, a conventional keyboard 2150 and mouse 2155 can be coupled to the input/output controller 2135. Other output devices such as the I/O devices 2140, 2145 may include input devices, for example but not limited to a printer, a scanner, microphone, and the like. Finally, the I/O devices 2140, 2145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 2100 can further include a display controller 2125 coupled to a display 2130. In an exemplary embodiment, the system 2100 can further include a network interface 2160 for coupling to a network 2165. The network 2165 can be an IP-based network for communication between the computer 2101 and any external server, client and the like via a broadband connection. The network 2165 transmits and receives data between the computer 2101 and external systems. In an exemplary embodiment, network 2165 can be a managed IP network administered by a service provider. The network 2165 may be implemented in a wireless fashion, e.g., using wireless protocols and technologies, such as WiFi, WiMax, etc. The network 2165 can also be a packet-switched network such as a local area network, wide area network, metropolitan area network, Internet network, or other similar type of network environment. The network 2165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 2101 is a PC, workstation, intelligent device or the like, the instructions in the memory 2110 may further include a basic input output system (BIOS) (omitted for simplicity). The BIOS is a set of essential software routines that initialize and test hardware at startup, start the OS 2111, and support the transfer of data among the hardware devices. The BIOS is stored in ROM so that the BIOS can be executed when the computer 2101 is activated.

When the computer 2101 is in operation, the processor 2105 is configured to fetch and execute instructions stored within the memory 2110, to communicate data to and from the memory 2110, and to generally control operations of the computer 2101 pursuant to the instructions.

In an exemplary embodiment, where the branch predictor 118 of FIG. 2 and/or the branch predictor 118' of FIG. 13 is implemented in hardware, the methods and processes described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 21:
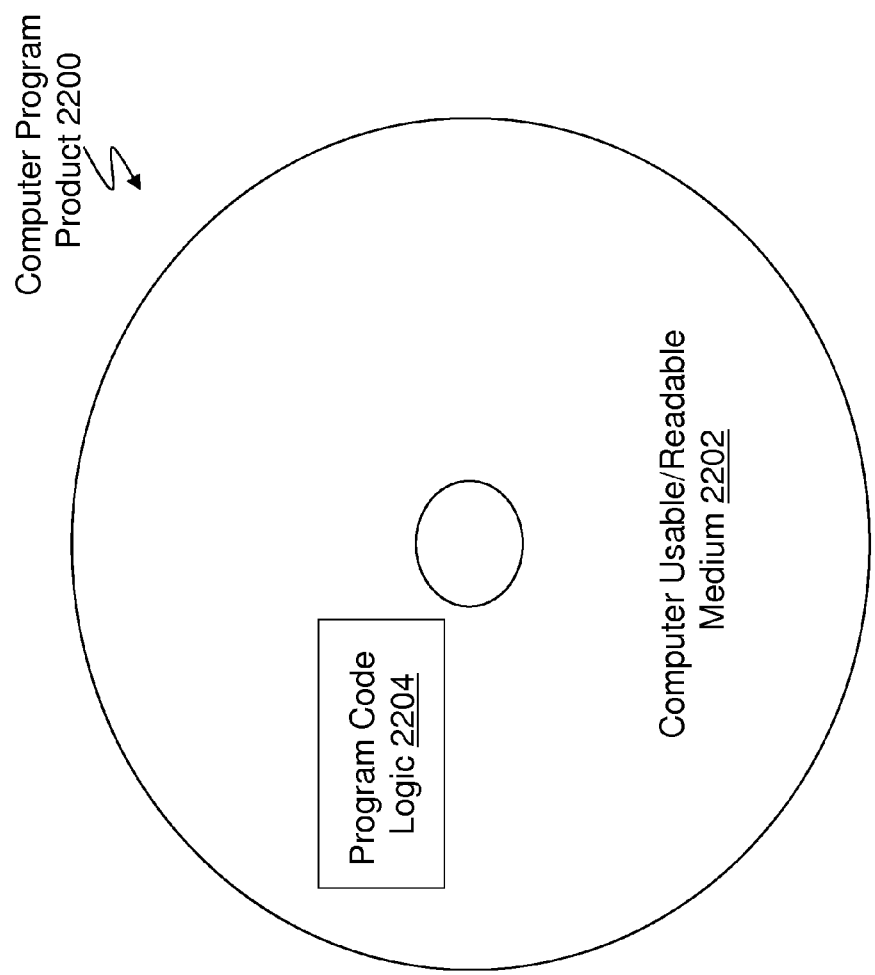
FIG. 21 depicts a computer-readable medium according to an embodiment.

Referring now to FIG. 21, in one example, a computer program product 2200 includes, for instance, one or more storage media 2202, wherein the media may be tangible and/or non-transitory, to store computer readable program code means or logic 2204 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Exemplary embodiments include a system, method, and computer program product for using a fast index tree (FIT) for accelerated branch prediction. The system includes a branch target buffer, a FIT structure, and a processing circuit configured to perform a method. The method includes determining that searching of the branch target buffer is to be performed under FIT control. A current search address for searching of the branch target buffer is saved. The branch target buffer is searched at the saved current search address for a branch prediction. A FIT next-search address is determined based on reading branch taken and branch not taken paths for a next search level of predicted branches from the FIT structure. The searching of the branch target buffer is re-indexed based on the FIT next-search address. It is determined whether the searching at the saved current search address located the branch prediction. Based on the searching at the saved current search address locating the branch prediction, the searching of the branch target buffer continues under FIT control with the current search address set based on the FIT next-search address. Based on the searching at the saved current search address failing to locate the branch prediction, the searching of the branch target buffer is re-indexed with the saved current search address and the searching of the branch target buffer is performed without FIT control.

In an embodiment, the processing circuit of the system is further configured to shut off auxiliary structures including one or more of: a multiple target table and a pattern history table, based on determining that searching of the branch target buffer is to be performed under FIT control.

In an embodiment, the FIT structure includes FIT content addressable memory to translate between a branch target buffer location and a FIT location, branch target buffer pointers to redirect searching of the branch target buffer for the branch taken and branch not taken paths when searching of the branch target buffer is under FIT control, and FIT pointers to redirect searching of the FIT structure for the branch taken and branch not taken paths. In an embodiment, the processing circuit of the system is further configured to determine whether a branch is found that belongs in the FIT structure based on determining that the searching of the branch target buffer is to be performed without FIT control. A FIT search can be started based on determining that the FIT search is not active and the branch is found that belongs in the FIT structure. Based on determining that the branch is found that belongs in the FIT structure and the branch is not identified in the FIT content addressable memory, the branch can be installed in the FIT structure. Based on determining that the branch is identified in the FIT content addressable memory and a previous branch leading to the branch belongs in the FIT structure, the FIT structure is updated to link the previous branch and the branch. In an embodiment, the processing circuit of the system is further configured to determine whether the searching of the branch target buffer is synchronized with the FIT search. The searching of the branch target buffer can be re-indexed based on whether the branch was taken or not taken. Based on determining that the searching of the branch target buffer is synchronized with the FIT search, the searching of the branch target buffer is performed under FIT control.

In an embodiment, the processing circuit of the system is further configured to search the FIT structure for a current search level and determine whether one or more pointers in a FIT entry for the current level are valid. The FIT search can be stopped based on determining that no pointers in the FIT entry for the current level are valid. In an embodiment, the processing circuit of the system is further configured to determine whether a prediction from the branch target buffer has been received within a predetermined number of search levels. Based on determining that the prediction from the branch target buffer has been received within the predetermined number of search levels, the current search level is incremented and the FIT structure is re-indexed based on the incremented current search level.

In an embodiment, the processing circuit of the system is further configured to access the FIT content addressable memory to determine whether the entry is in the FIT structure based on determining that an entry has been written in the branch target buffer. Based on determining that the entry is in the FIT structure, it is determined whether the entry is a valid match based on a FIT CAM valid field corresponding to the entry in the FIT content addressable memory. Based on determining that the entry is valid, the entry is invalidated in the FIT content addressable memory and all matching FIT pointers associated with the entry.

In an embodiment, the processing circuit of the system is further configured to save a next-FIT pointer based on determining that a branch has completed with a valid FIT pointer along a predicted path. Based on determining that a next completed branch is a surprise branch that belongs in the branch target buffer, all valid FIT pointers matching the saved next-FIT pointer are invalidated.

In an embodiment, the processing circuit of the system is further configured to select an entry to remove from the FIT structure based on writing a new entry in the FIT content addressable memory. Any valid pointers are invalidated in the FIT structure with a matching pointer value of the entry to remove from the FIT structure.

Technical effects and benefits include providing a fast index tree to improve branch prediction throughput. The FIT improves branch prediction throughput in a lookahead branch predictor by accelerating the re-index of the BTB search. Invalidation logic selectively invalidates FIT entries as they become stale as a function of BTB and FIT updates. Removing stale FIT entries further improves performance by avoiding dead-end FIT searches and/or skipped BTB predictions.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for accelerated branch prediction using a fast index tree (FIT), the system comprising:
   a branch target buffer;
   a FIT structure comprising one or more tables indexing locations of entries in the branch target buffer, the one or more tables comprising a plurality of entries that each represents a node in a binary tree and specifies a first next predicted branch instruction in the branch target buffer along a branch not taken path and a second next predicted branch instruction in the branch target buffer along a branch taken path, wherein each node of the binary tree represents a branch instruction in a program code; and
   a processing circuit configured to perform a method comprising:
      determining that searching of the branch target buffer is to be performed under FIT control;
      saving a current search address for searching of the branch target buffer;
      searching the branch target buffer at the saved current search address for a branch prediction;
      determining a FIT next-search address based on reading the first next predicted branch instruction along the branch not taken path and the second next predicted branch instruction along the branch taken path for a next search level of predicted branches from the FIT structure;
      re-indexing the searching of the branch target buffer based on the FIT next-search address;
      determining whether the searching at the saved current search address located the branch prediction;
      based on the searching at the saved current search address locating the branch prediction, continuing the searching of the branch target buffer under FIT control with the current search address set based on the FIT next-search address; and
      based on the searching at the saved current search address failing to locate the branch prediction, re-indexing the searching of the branch target buffer with the saved current search address and performing the searching of the branch target buffer without FIT control.

2. The system of claim 1, wherein the processing circuit is further configured to perform:
   shutting off auxiliary structures comprising one or more of: a multiple target table and a pattern history table, based on determining that searching of the branch target buffer is to be performed under FIT control.

3. The system of claim 1, wherein the FIT structure further comprises: FIT content addressable memory to translate between a branch target buffer location and a FIT location, branch target buffer pointers in the one or more tables to redirect searching of the branch target buffer for the branch taken and branch not taken paths when searching of the branch target buffer is under FIT control, and FIT pointers in the one or more tables to redirect searching of the FIT structure for the branch taken and branch not taken paths.

4. The system of claim 3, wherein the processing circuit is further configured to perform:
   based on determining that the searching of the branch target buffer is to be performed without FIT control, determining whether a branch is found that belongs in the FIT structure;
   starting a FIT search based on determining that the FIT search is not active and the branch is found that belongs in the FIT structure;
   based on determining that the branch is found that belongs in the FIT structure and the branch is not identified in the FIT content addressable memory, installing the branch in the FIT structure;
   based on determining that the branch is identified in the FIT content addressable memory and a previous branch leading to the branch belongs in the FIT structure, updating the FIT structure to link the previous branch and the branch;
   determining whether the searching of the branch target buffer is synchronized with the FIT search;
   re-indexing the searching of the branch target buffer based on whether the branch was taken or not taken; and
   based on determining that the searching of the branch target buffer is synchronized with the FIT search, performing the searching of the branch target buffer under FIT control.

5. The system of claim 4, wherein the FIT search further comprises:
   searching the FIT structure for a current search level;
   determining whether one or more pointers in a FIT entry for the current search level are valid;
   stopping the FIT search based on determining that no pointers in the FIT entry for the current search level are valid;

determining whether a prediction from the branch target buffer has been received within a predetermined number of search levels; and based on determining that the prediction from the branch target buffer has been received within the predetermined number of search levels, incrementing the current search level and re-indexing the FIT structure based on the incremented current search level.

6. The system of claim 3, wherein the processing circuit is further configured to perform:

based on determining that an entry has been written in the branch target buffer, accessing the FIT content addressable memory to determine whether the entry is in the FIT structure;

based on determining that the entry is in the FIT structure, determining whether the entry is a valid match based on a FIT CAM valid field corresponding to the entry in the FIT content addressable memory; and based on determining that the entry is valid, invalidating the entry in the FIT content addressable memory and all matching FIT pointers associated with the entry.

7. The system of claim 3, wherein the processing circuit is further configured to perform:

based on determining that a branch has completed with a valid FIT pointer along a predicted path, saving a next-FIT pointer; and based on determining that a next completed branch is a surprise branch that belongs in the branch target buffer, invalidating all valid FIT pointers matching the saved next-FIT pointer.

8. The system of claim 3, wherein the processing circuit is further configured to perform:

based on writing a new entry in the FIT content addressable memory, selecting an entry to remove from the FIT structure; and invalidating any valid pointers in the FIT structure with a matching pointer value of the entry to remove from the FIT structure.

9. A computer program product for accelerated branch prediction using a fast index tree (FIT), the computer program product comprising:

a non-transitory storage medium readable by a processing circuit and storing instructions for execution by the processing circuit for performing a method comprising:

determining, by the processing circuit, that searching of a branch target buffer is to be performed under FIT control;

saving a current search address for searching of the branch target buffer;

searching the branch target buffer at the saved current search address for a branch prediction;

determining, by the processing circuit, a FIT next-search address based on reading a first next predicted branch instruction along a branch not taken path and a second next predicted branch instruction along a branch taken path for a next search level of predicted branches from a FIT structure, the FIT structure comprising one or more tables indexing locations of entries in the branch target buffer, the one or more tables comprising a plurality of entries that each represents a node in a binary tree and specifies the first next predicted branch instruction in the branch target buffer along the branch not taken path and the second next predicted branch instruction in the branch target buffer along the branch taken path, wherein each node of the binary tree represents a branch instruction in a program code;

re-indexing the searching of the branch target buffer based on the FIT next-search address;

determining, by the processing circuit, whether the searching at the saved current search address located the branch prediction;

based on the searching at the saved current search address locating the branch prediction, continuing the searching of the branch target buffer under FIT control with the current search address set based on the FIT next-search address; and based on the searching at the saved current search address failing to locate the branch prediction, re-indexing the searching of the branch target buffer with the saved current search address and performing the searching of the branch target buffer without FIT control.

10. The computer program product of claim 9, the method further comprising:

shutting off auxiliary structures comprising one or more of: a multiple target table and a pattern history table, based on determining that searching of the branch target buffer is to be performed under FIT control.

11. The computer program product of claim 9, wherein the FIT structure further comprises: FIT content addressable memory to translate between a branch target buffer location and a FIT location, branch target buffer pointers in the one or more tables to redirect searching of the branch target buffer for the branch taken and branch not taken paths when searching of the branch target buffer is under FIT control, and FIT pointers in the one or more tables to redirect searching of the FIT structure for the branch taken and branch not taken paths.

12. The computer program product of claim 11, the method further comprising:

based on determining that the searching of the branch target buffer is to be performed without FIT control, determining whether a branch is found that belongs in the FIT structure;

starting a FIT search based on determining that the FIT search is not active and the branch is found that belongs in the FIT structure;

based on determining that the branch is found that belongs in the FIT structure and the branch is not identified in the FIT content addressable memory, installing the branch in the FIT structure;

based on determining that the branch is identified in the FIT content addressable memory and a previous branch leading to the branch belongs in the FIT structure, updating the FIT structure to link the previous branch and the branch;

determining whether the searching of the branch target buffer is synchronized with the FIT search;

re-indexing the searching of the branch target buffer based on whether the branch was taken or not taken; and based on determining that the searching of the branch target buffer is synchronized with the FIT search, performing the searching of the branch target buffer under FIT control.

13. The computer program product of claim 11, the method further comprising:

based on determining that an entry has been written in the branch target buffer, accessing the FIT content addressable memory to determine whether the entry is in the FIT structure;

based on determining that the entry is in the FIT structure, determining whether the entry is a valid match based on a FIT CAM valid field corresponding to the entry in the FIT content addressable memory;

based on determining that the entry is valid, invalidating the entry in the FIT content addressable memory and all matching FIT pointers associated with the entry;

based on determining that a branch has completed with a valid FIT pointer along a predicted path, saving a next-FIT pointer;

based on determining that a next completed branch is a surprise branch that belongs in the branch target buffer, invalidating all valid FIT pointers matching the saved next-FIT pointer;

based on writing a new entry in the FIT content addressable memory, selecting an entry to remove from the FIT structure; and invalidating any valid pointers in the FIT structure with a matching pointer value of the entry to remove from the FIT structure.

* * * * *